(12) United States Patent
Panchaksharaiah et al.

(10) Patent No.: US 12,720,171 B2
(45) Date of Patent: Aug. 25, 2026

(54) SYSTEMS AND METHODS TO GENERATE METADATA FOR CONTENT

(71) Applicant: Adeia Guides Inc., San Jose, CA (US)

(72) Inventors: Vishwas Sharadanagar Panchaksharaiah, Tumkur District (IN); Vikram Makam Gupta, Bangalore (IN)

(73) Assignee: Adeia Guides Inc., San Jose, CA (US)

(*) Notice: Subject to any disclaimer, the term of this patent is extended or adjusted under 35 U.S.C. 154(b) by 60 days.

(21) Appl. No.: 18/978,176

(22) Filed: Dec. 12, 2024

(65) Prior Publication Data

US 2025/0113086 A1 Apr. 3, 2025

Related U.S. Application Data

(63) Continuation of application No. 18/504,784, filed on Nov. 8, 2023, now Pat. No. 12,206,960, which is a continuation of application No. 17/950,681, filed on Sep. 22, 2022, now Pat. No. 11,849,079, which is a continuation of application No. 17/404,385, filed on Aug. 17, 2021, now Pat. No. 11,483,630.

(51) Int. Cl.

| | |
|---|---|
| ***H04N 21/8405*** | (2011.01) |
| ***G06F 16/735*** | (2019.01) |
| ***G06F 16/783*** | (2019.01) |
| ***H04N 21/442*** | (2011.01) |
| ***H04N 21/845*** | (2011.01) |

(52) U.S. Cl.
CPC ....... *H04N 21/8405* (2013.01); *G06F 16/735* (2019.01); *G06F 16/783* (2019.01); *H04N 21/44226* (2020.08); *H04N 21/8456* (2013.01)

(58) Field of Classification Search
None
See application file for complete search history.

(56) References Cited

U.S. PATENT DOCUMENTS

| | | | | |
|---|---|---|---|---|
| 6,546,405 | B2 * | 4/2003 | Gupta | G06F 16/40 715/233 |
| 7,444,660 | B2 * | 10/2008 | Dudkiewicz | G06F 16/735 725/54 |
| 8,316,396 | B2 * | 11/2012 | Kulick | H04N 7/17318 725/39 |
| 10,869,105 | B2 * | 12/2020 | Henderson | H04N 21/2353 |
| 11,115,722 | B2 * | 9/2021 | Johnson | H04N 21/4788 |
| 11,995,118 | B2 * | 5/2024 | Puniyani | G06F 40/289 |

(Continued)

*Primary Examiner* — Alexander Q Huerta
(74) *Attorney, Agent, or Firm* — HG LAW LLP

(57) ABSTRACT

Systems and methods are described herein for generating metadata for content. Upon detecting a request for a stored media asset from a first device, a server determines that metadata is needed for the media asset based on determining that (a) the server has access to insufficient metadata associated with the media asset and (b) the popularity of the media asset is sufficiently high. The server then assigns at least a time segment of the media asset to the first device for analysis. After assignment, the first device gathers frame analysis and user input data while the user is viewing the media asset, and transmits the gathered data to the server. The server then uses the frame analysis data and the user input data to generate metadata, and makes the generated metadata available to all devices requesting the media asset.

20 Claims, 11 Drawing Sheets

(56) References Cited

U.S. PATENT DOCUMENTS

| | | | | |
|---|---|---|---|---|
| 2009/0187825 | A1* | 7/2009 | Sandquist | G06F 16/78 715/719 |
| 2009/0300475 | A1* | 12/2009 | Fink | G06F 3/0482 726/4 |
| 2009/0319885 | A1* | 12/2009 | Amento | G06Q 10/10 715/230 |
| 2013/0046761 | A1* | 2/2013 | Soderberg | G06Q 10/40 707/736 |
| 2014/0101691 | A1* | 4/2014 | Sinha | H04N 21/235 725/32 |
| 2016/0019202 | A1* | 1/2016 | Adams | H04N 21/8547 704/9 |
| 2018/0184154 | A1* | 6/2018 | Braskich | H04N 21/4532 |
| 2021/0357463 | A1* | 11/2021 | Jarvis | G06F 9/451 |
| 2022/0132214 | A1* | 4/2022 | Felman | G06F 16/7867 |

* cited by examiner

| Metadata Items | Relevance |
|---|---|
| Paris | 30 |
| Studio | 25 |
| Dance | 10 |
| Ballet | 8 |
| • • • | |
| Tutu | 2 |

| Metadata Items | Relevance | Verified Users |
|---|---|---|
| Paris | 30 | 1 |
| Studio | 25 | 1 |
| Dance | 10 | |
| Ballet | 8 | |
| • • • | | |
| Tutu | 2 | 1 |

SYSTEMS AND METHODS TO GENERATE METADATA FOR CONTENT

CROSS-REFERENCE TO RELATED APPLICATIONS

This application is a continuation of U.S. patent application Ser. No. 18/504,784, filed Nov. 8, 2023 (now allowed), which is a continuation of U.S. patent application Ser. No. 17/950,681, filed Sep. 22, 2022, now U.S. Pat. No. 11,849,079, which is a continuation of U.S. patent application Ser. No. 17/404,385, filed Aug. 17, 2021, now U.S. Pat. No. 11,483,630, the disclosure of which is hereby incorporated by references herein in their entireties.

BACKGROUND

The present disclosure is directed to generating metadata for content. Specifically, when a media asset has insufficient metadata and is sufficiently popular, a server assigns segments of the media asset to different user devices to collect metadata, and then makes the collected metadata available after processing.

SUMMARY

The metadata associated with content, especially user-generated content, are crucial to optimizing searching for content, recommending content to users, finding related and duplicate content, and many other processes related to the organization and usage of media content. However, there are billions of content items with a limited amount of metadata (or no metadata at all), and the metadata that are available are often not properly structured or formatted. Generating metadata for all content would be costly and time-consuming, and it would be difficult to store metadata in centralized servers for all content.

In one approach, a central server could analyze every media asset available as content (e.g., through frame analysis) and generate metadata for each one. This approach is deficient because it would overwhelm the server's resource capabilities, as well as being prohibitively time-consuming. Also, the metadata would be missing the perspective of the user, as all of the metadata would be gathered through a server's analysis of the content.

In another approach, the server could require every uploader of user-generated content to provide metadata upon uploading their media asset. This approach is deficient because although the server is spared from analyzing content to generate metadata, the server still is tasked with storage of metadata for all content. The storage capacities of centralized servers would be overwhelmed with unnecessary metadata, as unpopular videos do not need as many metadata as the more popular, highly requested videos. Also, while the metadata provided upon upload would include the perspective of the uploader of the media asset, the perspective of other viewers of the media asset would be missing. Moreover, user-provided metadata can be poor or nonsensical, as users may rush to enter some metadata to meet the requirements.

To overcome these problems, systems and methods are provided herein for deciding when to generate metadata for a media asset, and for generating such metadata by leveraging the processing power of client devices that request media assets from a server. In one approach, a server determines that it has access to insufficient metadata for a stored media asset. In some embodiments, this determination is performed when the media asset has become sufficiently popular.

For example, the server determines that it has access to insufficient metadata for a stored media asset (the first media asset) by identifying a second media asset that has been requested a similar amount of times as the first media asset, and comparing the metadata available for the first media asset to the metadata available for the second media asset. In one approach, the server uses the amount of metadata available for the second media asset to set a threshold value, and if the amount of metadata available for the first media asset is under the threshold value, the server determines that there are insufficient metadata available for the first media asset.

Secondly, determining that a media asset is sufficiently popular is done, for example, by determining that a popularity score of a media asset (the first media asset) is sufficiently high. One way to accomplish this is by identifying a second media asset that has been requested a similar amount of times as the first media asset and comparing the popularity score of the first media asset to the popularity score of the second media asset. In some approaches, the server compares the popularity score of the first media asset to the popularity score of the second media asset by using the popularity score of the second media asset to set a threshold value, and if the popularity score of the first media asset is above the threshold value, the server determines that the popularity score of the first media asset is sufficiently high.

Such aspects enable a server to determine the media assets that are the best choices for metadata generation, by choosing content based on both the fact that it is missing metadata and is sufficiently popular to warrant the time and resources it takes to generate and store metadata. For example, if a content item has little to no metadata but is not often requested for viewing by user devices, the server will not facilitate metadata generation for that item. But if a media asset has no metadata and is being requested by many users, metadata will be generated, as the media content item needs metadata to be able to be appropriately searched for, recommended, and indexed. In this way, the server can save processing power by not generating metadata for all assets, while also ensuring that metadata are generated for popular media assets when needed.

In one embodiment, the server gathers data for metadata generation by assigning for analysis each requested media asset in its entirety to at least one device that has requested the media asset. One approach to this involves assigning a media asset to one or more user devices for analysis according to the complexity of the media asset and the strength of the user devices. The server determines the complexity of a media asset by, for example, calculating a complexity analysis score for the media asset. The server determines the strength of a user device by, for example, calculating a strength capability score for the device. In some approaches, the server assigns media assets with higher complexity analysis scores to user devices with higher strength capability scores, and assigns media assets with lower complexity analysis scores to user devices with lower strength capability scores. The server may determine the complexity of a media asset before determining the strength capability scores for the plurality of devices, after determining the strength capability scores for the plurality of devices, or at the same time as determining strength capability scores for the plurality of devices.

In one implementation, the server gathers data for metadata generation by dividing a requested media asset into a plurality of time segments and assigning each time segment of the plurality of time segments to at least one device that has requested the media asset for analysis. One approach to this involves dividing a media asset into a plurality of time segments by generating separate segments of a media asset. Another approach involves dividing the media asset into a plurality of time segments by using timestamps to define each time segment within the media asset, in order to virtually divide the media asset without generating separate segments (e.g., by selecting timestamps that would define segments of the asset).

In one approach, a time segment is assigned to one or more user devices for analysis according to the complexity of the time segment and the strength of the one or more user devices. The server determines the complexity of a time segment by, for example, calculating a complexity analysis score for the time segment. The server determines the strength of a user device by, for example, calculating a strength capability score for the user device. In some embodiments, time segments with higher complexity analysis scores are assigned to user devices with higher strength capability scores, and time segments with lower complexity analysis scores are assigned to user devices with lower strength capability scores.

Such aspects enable a server to generate metadata from certain client devices instead of generating at a centralized server. This avoids having an infeasibly large time and resource load on the server and wasting network resources (each user device receiving the media asset for metadata generation purposes has already requested receipt of the media asset for viewing). Also, the processing power of powerful client devices can be utilized. The server can identify and select which user devices are appropriate for the content that needs to be analyzed. For example, instead of the server analyzing every media asset frame by frame, the server assigns at least part of a media asset to at least one of the client devices requesting the media asset. In some implementations, the more powerful client devices are assigned more complex content or content segments, and the less powerful client devices are assigned less complex content or content segments. In such implementations each client device analyzes the content or segments assigned to it, collects data, and then transmits the collected data back to the server for metadata generation and storage.

In one implementation, the server gathers data for metadata generation through frame analysis performed by each client device. In one approach, the entirety of a media asset is sent to a user device for analysis, and the user device performs frame analysis on the entirety of the media asset. In another approach, one or more time segments of a media asset are sent to a user device for analysis, and the user device performs frame analysis on the one or more time segments of the media asset.

In another implementation, the server gathers data for metadata generation through user input data captured by each client device while users are viewing the media asset. In one approach, the entirety of a media asset is sent to a user device for analysis, and the user device captures user input throughout the entirety of the media asset. In another approach, one or more time segments of a media asset are sent to a user device for analysis, and the user device captures user input throughout the one or more time segments of the media asset assigned for analysis to this user device.

In yet another implementation, the server gathers data for metadata generation through a combination of frame analysis performed by each client device and user input data captured by each client device while users are viewing the media asset.

Such aspects also enable a server to include user input data while generating metadata. For example, instead of generating metadata only using what can be gleaned through frame analysis, client devices capture user input while users are viewing media assets. This results in more thorough, descriptive metadata that improve the organization of the media asset at the centralized server, allowing for more optimized search results, recommendations, and other related media asset usage processes.

In some implementations, upon detecting a request for a stored media asset from a first device, a server determines that metadata are needed for the media asset based on determining that (a) the server has access to insufficient metadata associated with the media asset and (b) the popularity score of the media asset is sufficiently high. The server then assigns at least a time segment of the media asset to the first device for analysis. The first device gathers frame analysis and user input data while the user is viewing the media asset, and transmits the gathered data to the server. The server uses the frame analysis data and the user input data to generate metadata, and makes the generated metadata available to all devices requesting the media asset. When a powerful user device requests a media asset for viewing, it makes sense to assign time segments of the media asset to the device for analysis because the server has to transmit the media asset to the device anyway. It also makes sense for the user device to gather both frame analysis and user input data for assigned segments, because that efficiently gathers enough data for the server to generate metadata all at once.

BRIEF DESCRIPTION OF THE DRAWINGS

The present disclosure, in accordance with one or more various embodiments, is described with reference to the following figures. The drawings are provided for purposes of illustration only and merely depict typical or example embodiments. These drawings are provided to facilitate an understanding of the concepts disclosed herein and do not limit the breadth, scope, or applicability of these concepts. It should be noted that for clarity and ease of illustration these drawings are not necessarily made to scale.

DETAILED DESCRIPTION OF EMBODIMENTS OF THE DISCLOSURE

Figure 1:
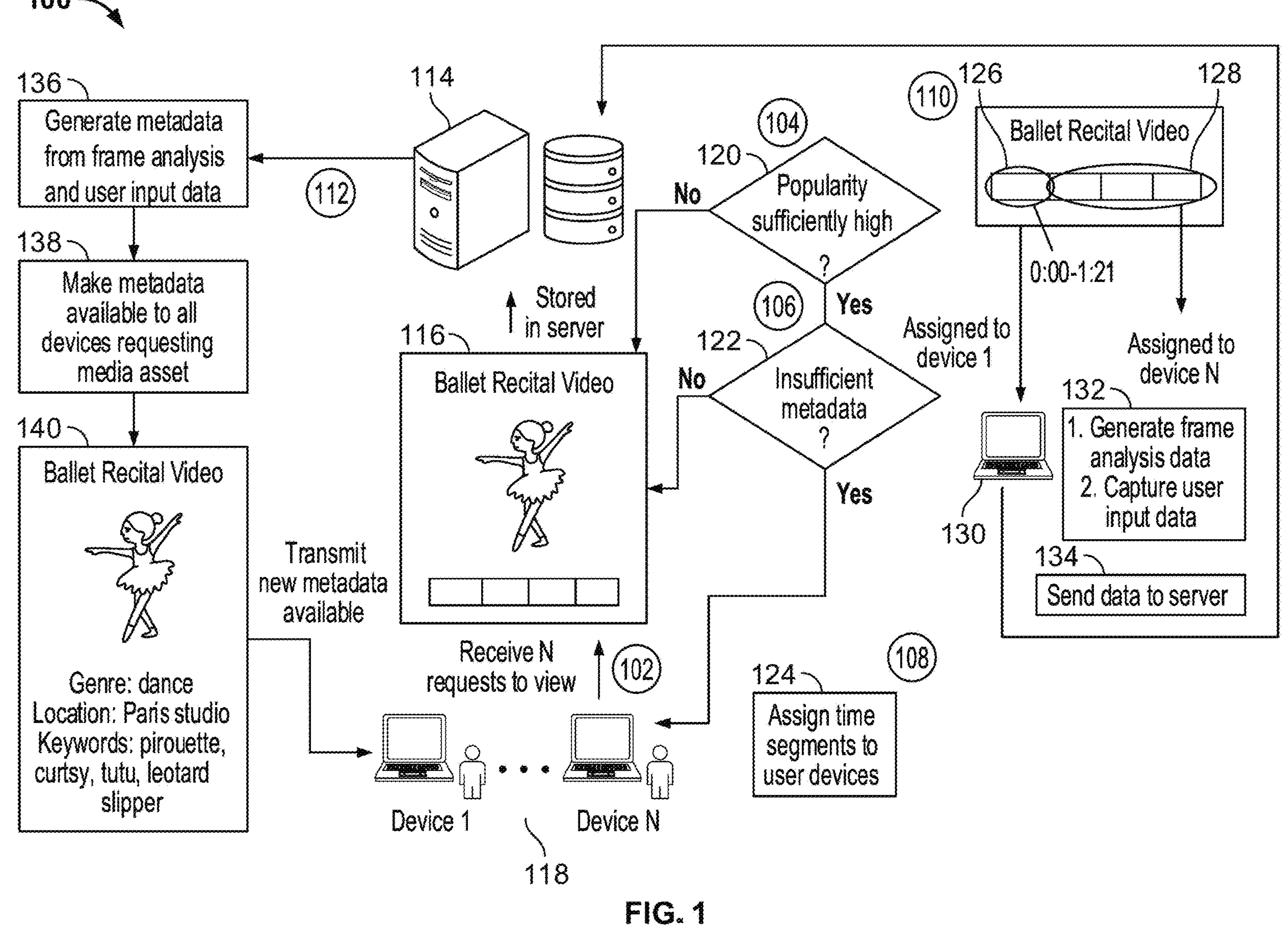
FIG. 1 is an illustrative example of a system for generating metadata for content, in accordance with some embodiments of the present disclosure.

FIG. 1 shows an illustrative example of a system 100 for generating metadata for a media asset (e.g., user-generated content), in accordance with some embodiments of the present disclosure. In some embodiments, system 100 includes server 114, media asset 116, an arbitrary number ("N") of user devices 118, and first user device 130. System 100 may include additional servers, devices and/or networks. For example, functionality of server 114 may be shared between several servers, providing a cloud computing solution.

In some embodiments, metadata comprise one or more of the title of a media asset, the genre of a media asset, the location of a media asset, and keywords associated with the media asset.

In some examples, the steps outlined within system 100 are performed by a Metadata Generating Application (hereinafter referred to as "MGA"). For example, a non-transitory memory of server 114 and/or non-transitory memories of devices 118 may store instructions that, when executed by processors of those devices, cause execution of the MGA, for example, by causing the MGA to execute the steps outlined within system 100.

In some embodiments, the MGA accesses media asset 116 stored in a memory of server 114. In some embodiments, at step 102, server 114 receives N requests to view media asset 116 (e.g., Ballet Recital Video) from N user devices 118. In one implementation, server 114 is an Over the Top (OTT) video delivery service server that receives requests over a network (e.g., the internet, a cellular network, or any suitable network) from user computing devices (e.g., smartphones, computers, laptops, etc.) to view the media asset (e.g., to stream the Ballet Recital video). The OTT server may then provide the media asset for streaming, local storage, downloading, or other media consumption operation to the requesting device.

In some embodiments, the MGA then proceeds to process step 104, wherein the MGA makes decision 120, determining whether the popularity of media asset 116 is sufficiently high. In some examples, determining whether the popularity of media asset 116 is sufficiently high comprises determining that the number of requests for media asset 116 is above a threshold value. In some embodiments, the threshold value is a preset number of requests (e.g., 100 requests or 1000 requests). In other examples, determining whether the popularity of media asset 116 is sufficiently high comprises calculating a popularity score of media asset 116. In some embodiments, the popularity score may be dynamically generated in any suitable manner (e.g., as described below with reference to FIG. 3). In some embodiments, if the popularity of media asset 116 is not sufficiently high, the MGA returns to process step 102, and continues to monitor for requests to view media asset 116.

In some embodiments, if the popularity of media asset 116 is sufficiently high, the MGA then proceeds to process step 106, wherein the MGA makes decision 122, determining whether server 114 has insufficient metadata associated with media asset 116. In one example, the MGA determines that there is insufficient metadata by comparing the metadata items associated with media asset 116 to a preset number of metadata items (e.g., 4 metadata items, or 10 metadata items). In another example, the MGA determines that there is insufficient metadata by identifying a second media asset that has been requested a similar amount of times as media asset (first media asset) 116, and comparing the metadata available for first media asset 116 to the metadata available for the second media asset (e.g., as described below with reference to FIG. 2). In some embodiments, if the server has sufficient metadata associated with media asset 116, the MGA returns to process step 102, and continues to monitor for requests to view media asset 116.

In some embodiments, if the server has insufficient metadata associated with media asset 116, the MGA proceeds to process step 108, wherein the MGA carries out action 124, assigning, by server 114, time segments 126-128 to N user devices 118. In one example, server 114 divides media asset 116 into a plurality of time segments 126-128. One approach to this involves dividing media asset 116 into a plurality of time segments 126-128 using timestamps to define each time segment within media asset 116, in order to virtually divide media asset 116 without generating separate segments.

In some embodiments, the MGA then proceeds to process step 110, wherein time segment 126 is assigned to first user device 130, and the remaining time segments 128 are assigned to N user devices 118. One approach to this involves assigning time segments 126-128 according to the complexity of time segments 126-128 and the strength of first user device 130 and N user devices 118 (e.g., as described below with reference to FIGS. 6A and 6B). The complexity of time segments and strength of devices may be determined in any suitable manner. For example, server 114 determines a complexity analysis score for each of the plurality of time segments 126-128, and server 114 determines a strength capability score for each of the first user device 130 and N user devices 118.

In some embodiments, the complexity analysis score for a time segment is computed based on the length of the time segment. In some embodiments, the strength capability score of a user device is computed based on one or more of processor speed, number of installed applications, amount of RAM present, device heat, stored user preferences for processing content, and processing history of each device.

In some embodiments, MGA assigns, by server 114, time segments 126-128 to N user devices 118 by creating a data structure outlining, for each segment, a segment ID, a beginning and ending timestamp, the IP address of the user device that the segment is assigned to, and collected metadata. An example of this is outlined in table 1 below. For example, a device with IP address 168.212.226.204 requests a media asset with media asset ID 1934867, e.g., Ballet Recital Video. While transmitting the media asset in its entirety to the device with IP address 168.212.226.204 for viewing, the assigned time segment, 9:00 to 10:00 of the media asset, will also be transmitted to the device for data analysis. In some embodiments, the lengths of the time segments are not the same. In some embodiments, the data structure outlined in table 1 may contain more than one media asset with unique media asset ID's. Assigning can also be done in any suitable manner, for example, by dividing media asset 116 into time segments by generating separate segments of media asset 116 and transmitting them over the network to each user device for analysis.

TABLE 1

| Ballet Recital Video, length 10:00 | | | | | |
|---|---|---|---|---|---|
| Media Asset ID | Segment ID | Beginning Timestamp | Ending Timestamp | Assigned Device List/IP address | Collected Metadata |
| 1934867 | 1 | 0:00 | 0:45 | 162.205.212.201 | Frame analysis data, User input data. |
| . . . | . . . | | | | |
| 1934867 | 10 | 9:00 | 10:00 | 168.212.226.204 | Frame analysis data, User input data. |

| Time segment transmitted to device 168.212.226.204 upon request: |
|---|
| 9:00<br>10:00 |

In some embodiments, first user device 130 then carries out action 132 as a part of step 110, generating frame analysis data and capturing user input data while first user device 130 views media asset 116.

Frame analysis is, for example, one or more of object recognition analysis, edge detection analysis, and artificial intelligence analysis (e.g., as described below with reference to FIG. 5). User input data is, for example, one or more of voice expressions made by the user while viewing the media asset (captured through the user device or a smart speaker on the same network as the user device), browser searches initiated by the user while viewing the media asset, social media posts published by the user while viewing the media asset, and text or email messages sent by the user while viewing the media asset (e.g., as described below with reference to FIG. 4).

In some embodiments, first user device 130 then carries out action 134, sending the generated frame analysis data and captured user input data resulting from action 134 to server 114. In one approach, first user device transmits the data over a network (e.g., the internet) to server 114.

In some embodiments, the MGA then proceeds to process step 112, wherein the MGA carries out action 136, generating, by server 114, metadata 140 from the frame analysis data and user input data transmitted to server 114. In some embodiments, the MGA then carries out action 138, making the generated metadata 140 available to all N user devices 118 requesting media asset 116 by transmitting the metadata 140 to all N user devices 118. In one approach, server 114 transmits the metadata 140 over a network (e.g., the internet) to N user devices 118.

In some embodiments, the process steps of system 100 are performed for the first time for a media asset after the media asset is uploaded to the OTT server by a user. In some embodiments, the process steps are then periodically rerun, e.g., every month, until there are sufficient metadata associated with the media asset. In some embodiments, the process steps can be rerun when there is an unusual spike in demand for the media asset, rendering the original threshold values for sufficient metadata for a media asset as inaccurate.

In some embodiments, after decision 122, server 114 may generate metadata for a media asset using its own resources. This solution retains the improvements of choosing to generate metadata only for videos with insufficient metadata and sufficiently high popularity scores, though it does not offload processing and analysis to powerful user devices. Within this example, after the server generates metadata on its own, the MGA proceeds to action 138 and makes the generated metadata available to all user devices requesting the media asset.

In some embodiments, after process step 102, server 114 may proceed to process step 106, wherein the MGA makes decision 122, determining whether server 114 has insufficient metadata associated with media asset 116, without carrying out process step 104, wherein the MGA makes decision 120, determining whether the popularity of media asset 116 is sufficiently high. In this example, the MGA may carry out the process of metadata generation without determining that server 114 has insufficient metadata associated with media asset 116. In another example, after process step 104, server 114 may proceed to process step 108, wherein the MGA carries out action 124, assigning, by server 114, time segments 126-128 to N user devices 118. In this example, the MGA may carry out the process of metadata generation without determining whether the popularity of media asset 116 is sufficiently high. In yet another example, after process step 102, server 114 may proceed to process step 108, wherein the MGA carries out action 124, assigning, by server 114, time segments 126-128 to N user devices 118. In this example, the MGA may carry out the process of metadata generation without determining whether server 114 has insufficient metadata associated with media asset 116 and without determining whether the popularity of media asset 116 is sufficiently high.

In some embodiments, the MGA begins the process of metadata generation at process step 110, assigning content to user devices without dividing it into time segments. This solution retains the improvements of offloading processing and analytics to powerful user devices, though it does not generate metadata only for videos with insufficient metadata and sufficiently high popularity scores.

In some embodiments, at process step 110, server 114 assigns for analysis the entirety of media asset 116 to one or more of the N user devices 118. This eliminates the expenditure of processing power required to divide media assets, and allows data to be gathered for the whole media asset, not just specific segments. This may result in quicker data gathering, and thus, quicker metadata generation. In this case, action 132, gathering frame analysis data and capturing user input data, may be done for the entirety of media asset 116.

In some embodiments, at action 132, first user device 130 generates frame analysis data without capturing user input data. This may be done when there is a lack of user input while a user of first user device 130 is viewing the media asset. In another approach, first user device 130 captures user input data without generating frame analysis data. This may be done when first user device 130 does not have the technological capabilities or processing power to generate frame analysis data. In some embodiments, gathering frame analysis data and/or capturing user input data may be done for the entirety of media asset 116.

In some embodiments, after action 132, wherein the MGA generates frame analysis data and captures user input data, the MGA may not proceed to process step 134, wherein the MGA sends the generated frame analysis data and captured user input data resulting from action 134 to server 114. In this case, the generated and captured data will not be transmitted to the server.

The improvement aspects outlined in system 100 may be combined in any suitable combination, taken in part, or as a whole.

Figure 2:
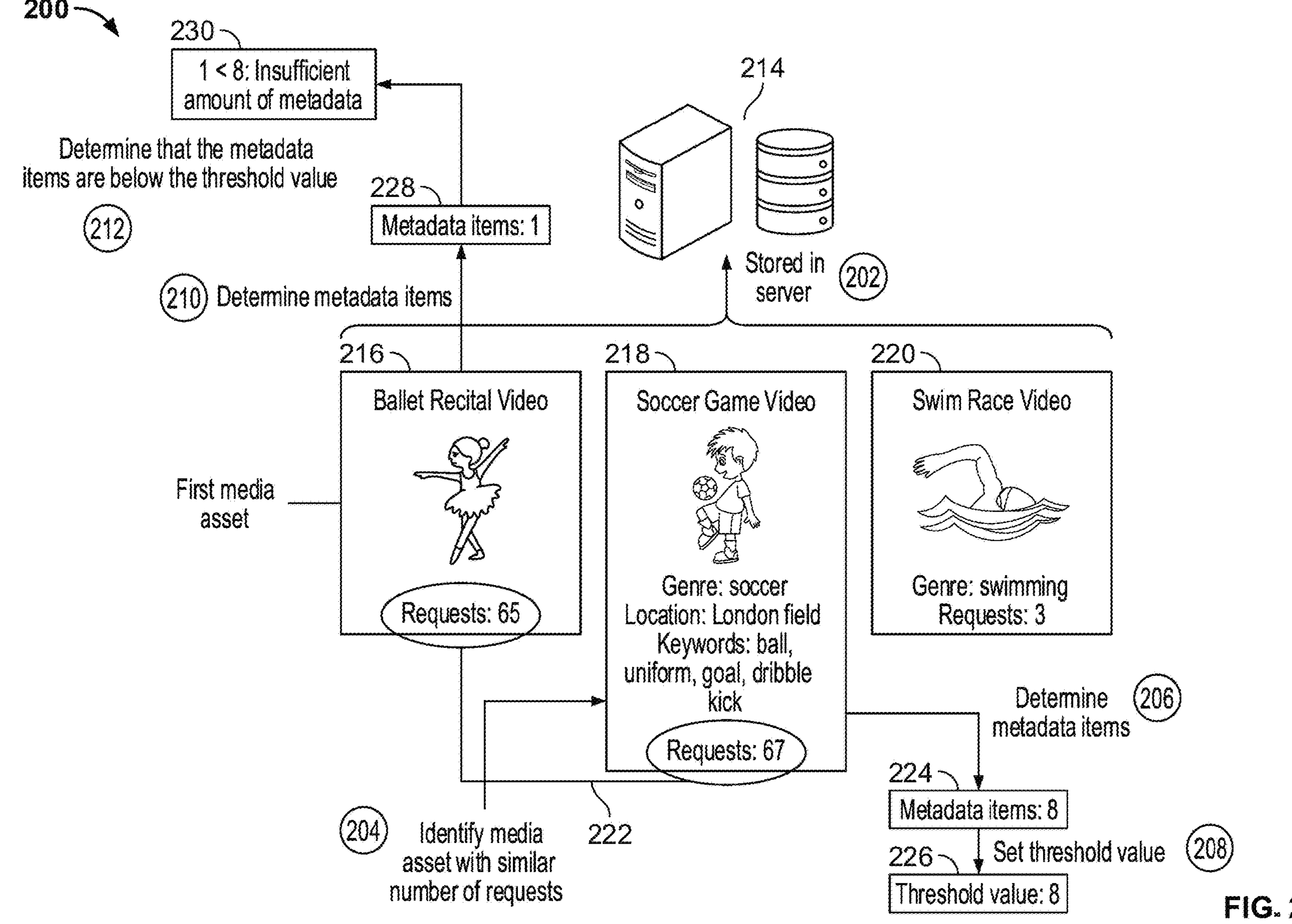
FIG. 2 is an illustrative example of a system for generating metadata for determining that a server has access to an insufficient amount of metadata associated with a media asset, in accordance with some embodiments of the present disclosure.

FIG. 2 shows an illustrative example of system 200 for determining that a server has access to an insufficient amount of metadata associated with a media asset, in accordance with some embodiments of the present disclosure. System 200 includes server 214, first media asset 216, second media asset 218, and Nth media asset 220. In some embodiments, server 214 is the same server as server 114, and first media asset 216 is the same as media asset 116 within FIG. 1.

In some embodiments, system 200 outlines further details of process step 106 within FIG. 1, in which decision 122 is made, determining whether server 114 has insufficient metadata associated with media asset 116.

In some examples, the steps outlined within system 200 are performed by the MGA of FIG. 1. For example, a non-transitory memory of server 214 may store instructions that, when executed by processors of server 214, cause execution of the MGA, for example, by causing the MGA to execute the steps outlined within system 200.

In some embodiments, at process step 202, the MGA accesses media assets 1-N 216-220 stored in a memory of server 214. In some embodiments, at process step 204, the MGA identifies a second media asset 218, also stored in server 214, that has a similar number of requests 222 to first media asset 216. In one example, the number of requests of the first media asset 216 and second media asset 218 must be the same. In another example, the number of requests of the second media asset 218 must be within 5% (rounded to the nearest whole number) of first media asset 216, e.g., if first media asset 216 has 65 requests, in order for a media asset to be identified as having a similar number of requests, the media asset must have between 62 and 68 requests.

In some embodiments, the MGA then proceeds to process step 206, wherein the MGA 200 determines the number of metadata items 224 associated with second media asset 218. In some embodiments, the number of metadata items for a media asset is counted by adding 1 item for the existence of a title of the media asset, 1 item for the existence of a genre of the media asset, 1 item for the existence of a location of the media asset, and 1 item for each keyword associated with the media asset. For example for second media asset 218, there is a title, "Soccer Game Video," a genre, "soccer," a location, "London field," and 5 keywords, "ball," "uniform," "goal," "dribble," and "kick"; thus, there are 8 metadata items 224 associated with media asset 218.

In some embodiments, the MGA then proceeds to process step 208, wherein the MGA sets a threshold value 226 based on the number of metadata items 224 associated with second media asset 218. In one example, the threshold value 226 is the number of metadata items 224 associated with second media asset 218, e.g., if second media asset 218 has 8 metadata items, threshold value 226 is 8.

In some embodiments, the MGA then proceeds to process step 210, wherein the MGA determines the number of metadata items 228 associated with first media asset 216. In some embodiments, the MGA then proceeds to process step 212, wherein the MGA carries out first media asset metadata and threshold value comparison 230 to determine that the number of metadata items 228 associated with first media asset 216 is below threshold value 226, and thus deems insufficient the amount of metadata items 228 associated with first media asset 216.

In some embodiments, server 214 determines that it has access to insufficient metadata for media asset 216 by determining that the media asset 216 does not have access to any metadata, even a title. In some embodiments, determining that server 214 has access to insufficient metadata for media asset 216 further comprises determining that the only metadata the server has access to is the title of media asset 216.

Figure 3:
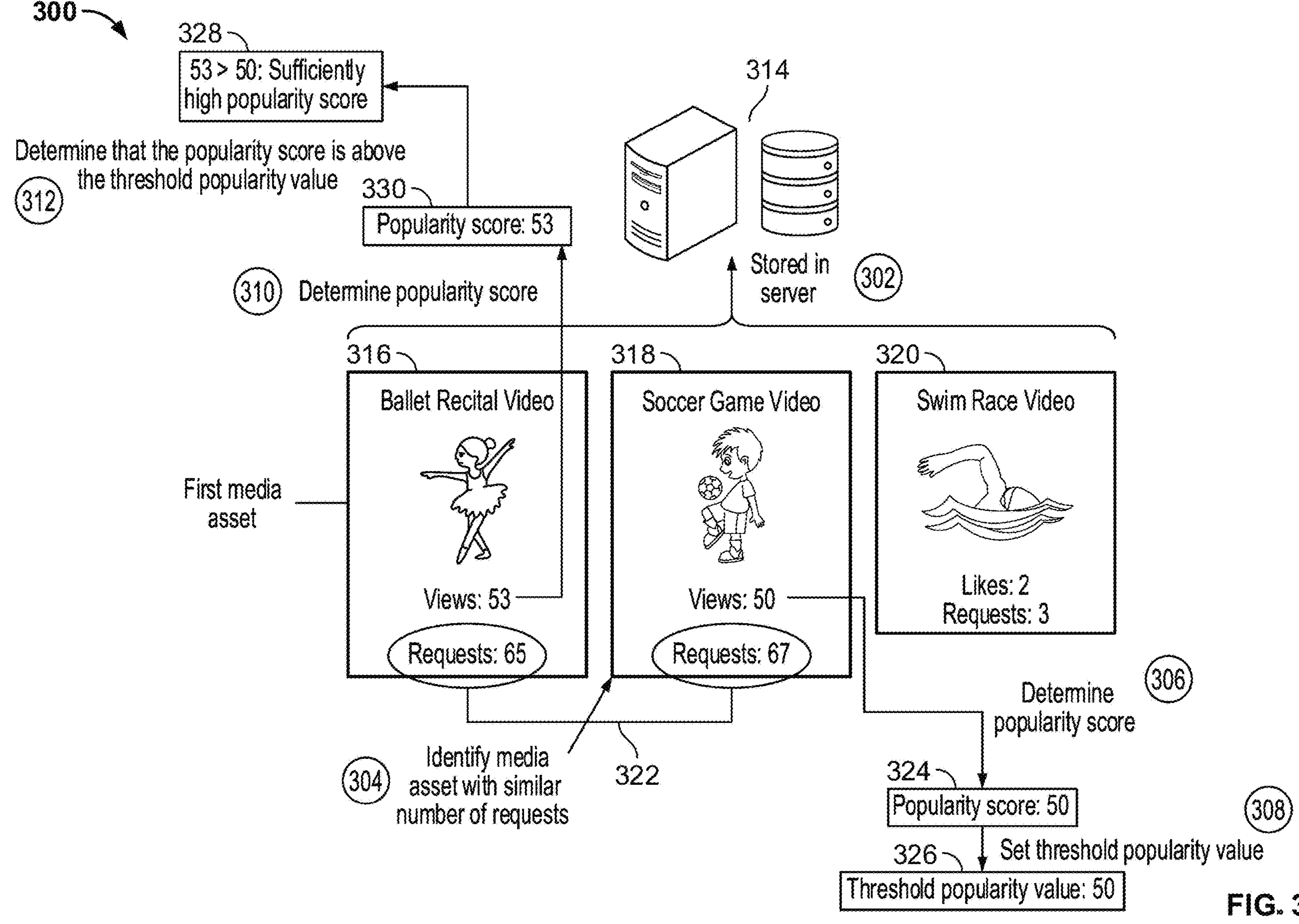
FIG. 3 is an illustrative example of a system for determining that the popularity score of a media asset is sufficiently high for the purpose of metadata generation, in accordance with some embodiments of the present disclosure.

FIG. 3 shows an illustrative example of system 300 for determining that the popularity score of a media asset is sufficiently high for the purpose of metadata generation, in accordance with some embodiments of the present disclosure. System 300 includes server 314, first media asset 316, second media asset 318, Nth media asset 320. In some embodiments, server 314 is the same server as server 114, and first media asset 316 is the same as media asset 116 within FIG. 1.

In some embodiments, system 300 outlines further details of process step 104 within FIG. 1, in which decision 120 is made, determining whether the number of requests to view media asset 116 is over a threshold value.

In some examples, the steps outlined within system 300 are performed by the MGA of FIG. 1. For example, a non-transitory memory of server 314 may store instructions that, when executed by processors of server 314, cause execution of the MGA, for example, by causing the MGA to execute the steps outlines within system 300.

In some embodiments, at process step 302, the MGA accesses media assets 1-N 316-320 stored in a memory of server 314. In some embodiments, at process step 304, the MGA identifies a second media asset 318, also stored in server 314, with a similar number of requests 322 to the first media asset 316. In one example, the number of requests of the first media asset 316 and second media asset 318 must be the same. In another example, the number of requests of the second media asset 318 must be within 5% (rounded to the nearest whole number) of first media asset 316, e.g., if first media asset 316 has 65 requests, in order for a media asset to be identified as having a similar number of requests, the media asset must have between 62 and 68 requests.

In some embodiments, the MGA then proceeds to process step 306, wherein the MGA determines a popularity score 324 of the second media asset 318. In some embodiments, the popularity score of a media asset is the number of requests for the media asset.

In one implementation, the popularity score of a media asset is the number of views of the media asset. The number of views is, for example, the number of times a requested media asset has been watched to completion at a user device.

In another implementation, the popularity score of a media asset is based on one or more factors associated with the media asset, wherein the factors comprise one or more of number of views, number of forwards, number of likes, number of comments, number of references, and number of trending topics. For example, popularity score may be calculated according to the following formula: c1*V+c2*F+c3*L+c4*O+c4*R+c5*T, wherein c1, c2, c3, c4, and c5 are preset coefficients, and wherein V is the number of views, F is the number of forwards, L is the number of likes, O is the number of comments, R is the number of references, and T is the number of trending topics. For example, if there are 500 views, 100 forwards, 275 likes, 47 comments, 3 references, and 2 trending topics, and each of c1 is 1, c2 is 1, c3 is 1, c4 is 1, and c5 is equal to 10, the popularity score would be 945. In other embodiments, any other suitable formula based on the same factors may be used to calculate popularity score.

The number of forwards is, for example, the number of times a media asset is sent by one user device to another user device via email, text messaging, social media messaging, or any other messaging service. For example, a forward comprises: (1) a user device receiving user selection of an option to share a media asset, (2) the user device receiving user selection of an option indicating the vehicle through which to share the media asset, e.g., text messaging, (3) the user device receiving incremental input indicating a second user device to forward the media asset to, and (4) the user device receiving user selection of an option to forward the media asset to a second user device.

The number of likes is, for example, the number of times user devices have selected an option to like a media asset on a social network. For example, during consumption of a media asset, the user interface of the MGA may display an option to like the media asset, e.g., a plus button, a heart button, and a thumbs-up button. In some embodiments, other user devices may be able to view the number of "likes" a media asset has gotten from other user devices, and the number of "likes" will dynamically update based on new user devices "liking" the media asset.

In some embodiments, number of comments comprises the number of written comments associated with the media asset that have been created by user devices.

The number of references is, for example, the number of times a media asset is referred to in an article, blog, social media post, or other written post available on the internet. References may be found by, for example, a web crawler operated by search engines within the network (e.g., the internet) mentioned in FIG. 1. In some embodiments, the web crawler downloads and indexes content from the internet to retrieve all mentions of the title of a media asset.

In some embodiments, the number of trending topics is the number of trending topics a media asset is associated with. Trending topics may be determined by news network websites, such as CNN, CBS, and ABC News. Trending topics may also be determined by the OTT video delivery service server 114 of FIG. 1, for example, by identifying the keywords of the videos being watched most frequently over a given time period. For example, if "the Olympics" is a trending topic on CNN, and "swimming" is a keyword associated with many of the top videos on the OTT video delivery service server 114 of FIG. 1, "the Olympics" and "swimming" are both trending topics. Further, for example, if a media asset is a recording of an Olympian swimming laps in a practice pool, the media asset will have two trending topics.

In some embodiments, after determining the popularity score 324 of second media asset 318, the MGA then proceeds to process step 308 and sets a threshold popularity value 326 based on popularity score 324 of second media asset 318.

In some embodiments, the MGA then proceeds to process step 310, wherein the MGA determines a popularity score 330 of the first media asset 316. In some embodiments, the MGA then proceeds to process step 312, wherein the MGA carries out the first media asset popularity score and threshold value comparison 328 to determine that the popularity score 330 of first media asset 316 is sufficiently high.

Figure 4:
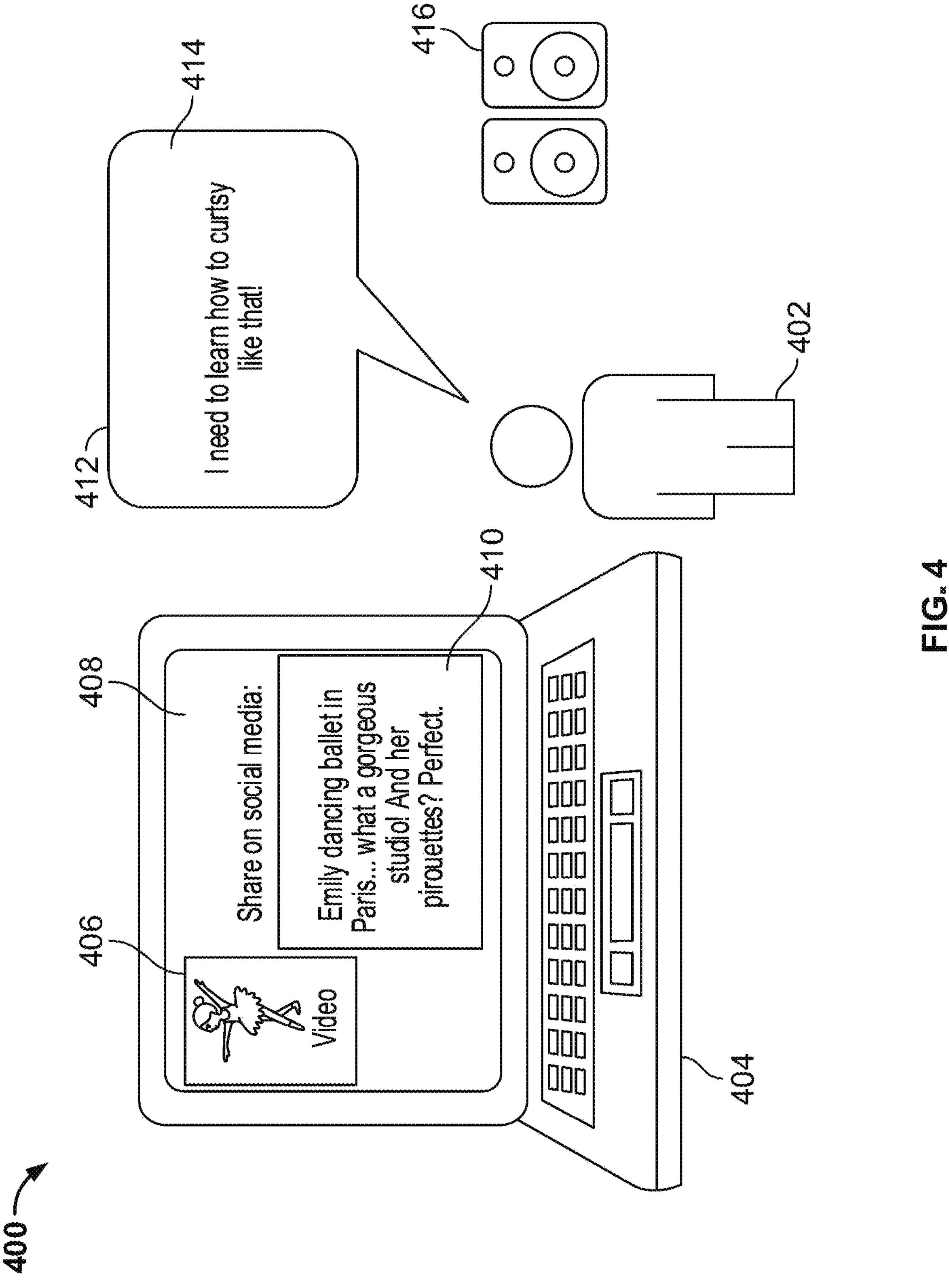
FIG. 4 is an illustrative example of a system for capturing user input during the playing of a media asset to generate user input data, in accordance with some embodiments of the present disclosure.

FIG. 4 shows an illustrative example of system 400 for capturing user input during the playing of a media asset to generate user input data, in accordance with some embodiments of the present disclosure. System 400 includes user device 404, media asset 406, and smart speaker 416. In some embodiments, user device 404 is the same as first user device 130, and media asset 406 is the same as media asset 116 within FIG. 1.

In some embodiments, system 400 outlines further details of action 132 within FIG. 1, in which first user device 130 captures user input data from media asset 116.

In some examples, the processes outlined within system 400 are performed by the MGA of FIG. 1. For example, non-transitory memories of user device 404 and smart speaker 416 may store instructions that, when executed by processors of user device 404 and/or smart speaker 416, cause execution of the MGA, for example, by causing the MGA to execute the steps outlined within system 400.

In some embodiments, user 402 is viewing media asset 406 (e.g., Ballet Recital Video) on user device 404 (e.g., a laptop). In one implementation, while the user is viewing media asset 406, user device 404 receives a user request via UI to share a social media post 408 about media asset 406. Social media post 408 contains, for example, media asset 406 and keywords 410 (e.g. ballet, Paris, studio, pirouettes). In some embodiments, user device 404 gathers keywords 410 as user input data.

Some examples of user comments when sharing a media asset within a social media post or within a message include "Suspense waiting at the end," "Kid's acting skills is amazing" and "Scary snake."

In another implementation, while viewing media asset 406, user 402 speaks user expression 412. User expression 412 contains, for example, keyword 414 (e.g., curtsy). In some embodiments, smart speaker 416 (e.g., an Amazon Alexa device, Google Home device, Homepod device, or any other smart speaker), a smart listening device on the same network (e.g., Wi-Fi network) as user device 404, transmits keyword 414 to user device 404 to be captured as user input data.

Some examples of user expressions include "This scene is awesome," "We should go to Rome," and "Buicks are always smooth."

In some embodiments, users may share a similar video in a conversation about media asset 406. In this case, the MGA may inherit keywords tagged to the similar video to associate with media asset 406.

In some embodiments, keywords gathered from social media post 408 and smart speaker 416 are aggregated as user input data gathered from user 402 on user device 404.

Figure 5:
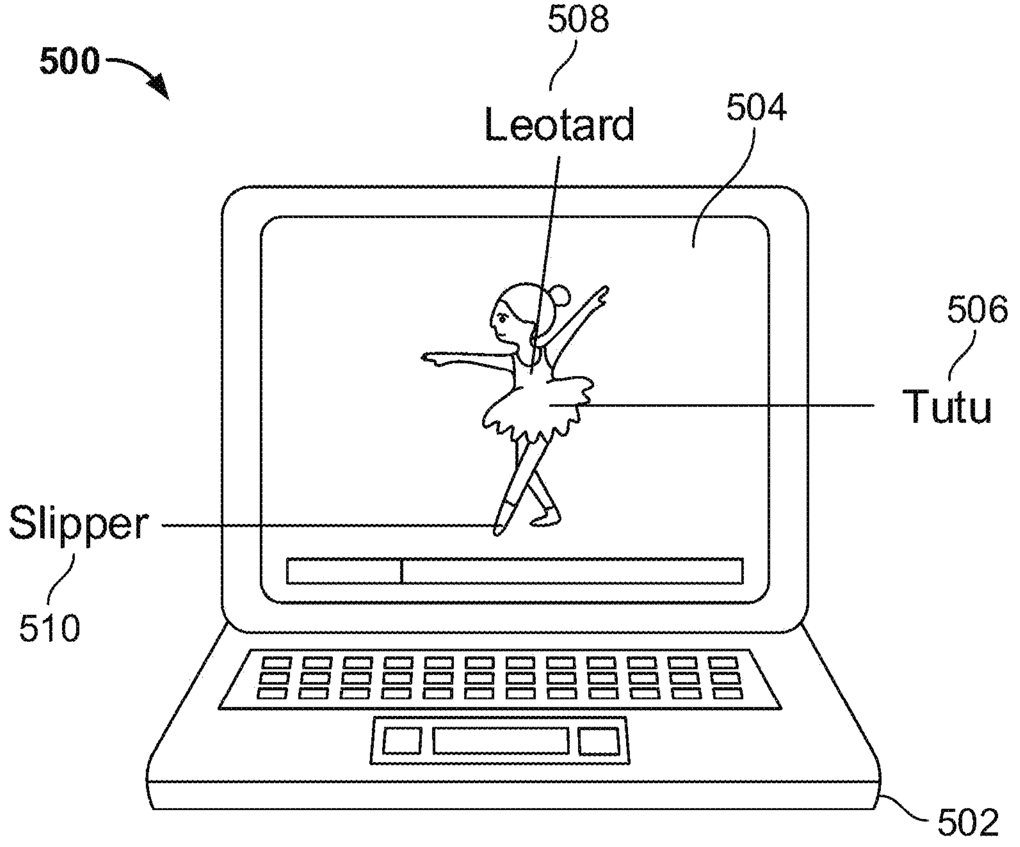
FIG. 5 is an illustrative example of a system for analyzing frames of a media asset during playing of the media asset to generate frame analysis data, in accordance with some embodiments of the present disclosure.

FIG. 5 shows an illustrative example of system 500 for analyzing frames of a media asset during playing of the media asset to generate frame analysis data, in accordance with some embodiments of the present disclosure. System 500 includes user device 502 and media asset 504. In some embodiments, user device 502 is the same as first user device 130, and media asset 504 is the same as media asset 116 within FIG. 1.

In some embodiments, system 500 outlines further details of action 132 within FIG. 1, in which first user device 130 captures frame analysis data from media asset 116.

In some examples, the processes outlined within system 500 are performed by the MGA of FIG. 1. For example, a non-transitory memory of user device 502 may store instructions that, when executed by processors of user device 502, cause execution of the MGA, for example, by causing the MGA to execute the steps outlined within system 500.

In some embodiments, user device 502 (e.g., a laptop) is displaying media asset 504 (e.g., Ballet Recital Video) for viewing. In some examples, user device 502 concurrently performs frame analysis on media asset 504. Frame analysis is, for example, object recognition analysis, edge detection analysis, artificial intelligence analysis or some combination thereof. For example, systems and methods for performing object recognition within a media asset are described within United States patent application publication No. 2020/0175019, which is hereby incorporated by reference in this application in its entirety. In one example, frame analysis results in keyword 508 (e.g., leotard), keyword 506 (e.g., tutu), and keyword 510 (e.g., slipper) being generated as frame analysis data.

Figures 6A, 6B:
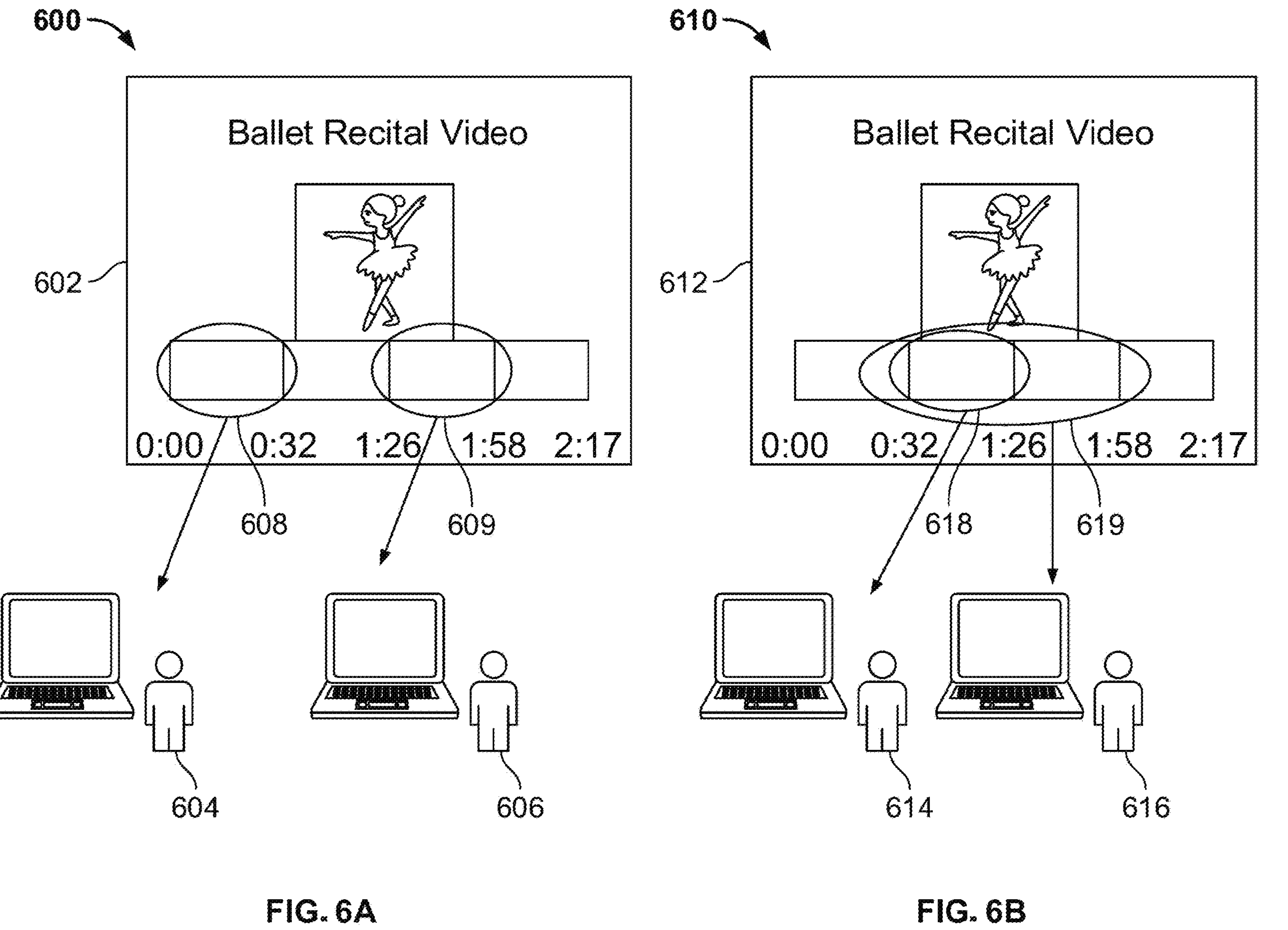
FIG. 6A is an illustrative example of a system for dividing a media asset into a plurality of time segments and assigning each time segment to at least one device for analysis, in accordance with some embodiments of the present disclosure.
FIG. 6B is an illustrative example of a system for dividing a media asset into a plurality of time segments and assigning each time segment to at least one device for analysis, in accordance with some embodiments of the present disclosure.

FIG. 6A shows an illustrative example of system 600 for dividing a media asset into a plurality of time segments and assigning each time segment to at least one device for analysis, in accordance with some embodiments of the present disclosure. System 600 includes media asset 602 (e.g., Ballet Recital Video), first user device 604 (e.g., a laptop), and Nth user device 606 (e.g., a laptop). In some embodiments, media asset 602 is the same as media asset 116, and first user device 604 is the same as first user device 130, within FIG. 1.

In some embodiments, system 600 outlines further details of process step 110 within FIG. 1 in which time segment 126 is assigned to first user device 130, and the remaining time segments 128 are assigned to N user devices 118.

In some examples, the processes outlined within system 600 are performed by the MGA of FIG. 1. For example, non-transitory memories of user devices 604 and 606 may store instructions that, when executed by processors of user devices 604 and 606, cause execution of the MGA, for example, by causing the MGA to execute the steps outlined within system 600.

In some embodiments, the entirety of media asset 602 is assigned to one or more of user devices 604-606 for analysis. In other embodiments, media asset 602 is divided into a plurality of time segments 608-609. In the pictured implementation, time segment 608 and 609 do not overlap within media asset 602. In one example, time segments 608-609 are generated as separate time segments. In another example, media asset 602 is divided into a plurality of time segments 608-609 using timestamps to define each time segment within media asset 602, in order to virtually divide media asset 602 without generating separate segments.

In some embodiments, time segment 608 is assigned to first user device 604, and time segment 609 is assigned to the Nth user device 606. One approach to this involves assigning time segments 608 and 609 according to the complexity of each time segment and the strength of each user device 604 and 606.

In some embodiments, a server has calculated a complexity analysis score for each time segment of the plurality of time segments and a strength capability score for each user device of the plurality of user devices (e.g., as described above with reference to FIG. 1).

In some embodiments, the complexity analysis score for a time segment is computed based on the length of the time segment. For example, if the time segment is 30 seconds long, the complexity analysis score may be 30. In some embodiments, the strength capability score of a user device is computed based on one or more of processor speed, number of installed applications, amount of RAM present, device heat, stored user preference rating for processing content, and processing history rating of each device. For example, the strength capability score may be calculated according to the following formula: c1*P-c2*1+c3*R-c4*D+c4*S+c5*H, wherein c1, c2, c3, c4, and c5 are preset coefficients, and wherein P is the processor speed, I is the number of installed applications, R is the amount of RAM present, D is the device heat, S is the stored user preference rating for processing content, and H is the processing history rating of the each device. For example, if P is 10, I is 57, R is 200, D is 30, S is 10, H is 8, and each of c1 is 1, c2 is 1, c3 is 1, c4 is 1, and c5 is equal to 10, the strength capability score is 213. In other embodiments, any other suitable formula based on the same factors may be used to calculate the strength capability score.

In some embodiments, time segments are assigned to user devices with appropriate strength capability scores relative to the time segment's complexity analysis score. For example, time segment 608 is assigned to first user device 604 because time segment 608 has a lower complexity analysis score than time segment 609, and user device 604 has a lower strength capability score than Nth user device 606.

FIG. 6B shows an illustrative example of system 610 for dividing a media asset into a plurality of time segments and assigning each time segment to at least one device for analysis, in accordance with some embodiments of the present disclosure. System 610 includes media asset 612 (e.g., Ballet Recital Video), first user device 614 (e.g., a laptop), and Nth user device 616 (e.g., a laptop). In some embodiments, media asset 612 is the same as media asset 116, and first user device 614 is the same as first user device 130, within FIG. 1.

In some embodiments, system 600 outlines further details of process step 110 within FIG. 1 in which time segment 126 is assigned to first user device 130, and the remaining time segments 128 are assigned to N user devices 118.

In some examples, the processes outlined within system 610 are performed by the MGA of FIG. 1. For example, non-transitory memories of user devices 614 and 616 may store instructions that, when executed by processors of user devices 614 and 616, cause execution of the MGA, for example, by causing the MGA to execute the steps outlined within system 610.

In some embodiments, the entirety of media asset 612 is assigned to one or more of user devices 614-616 for analysis. In other embodiments, media asset 612 is divided into a plurality of time segments 618-619. In the pictured implementation, time segment 618 and 619 overlap within media asset 612: time segment 619 contains time segment 618. In one example, time segments 618 and 619 are generated as separate time segments. In another example, media asset 612 is divided into a plurality of time segments 618-619 using timestamps to define each time segment within media asset 612, in order to virtually divide media asset 612 without generating separate segments.

In some embodiments, time segment 618 is assigned to first user device 614, and time segment 619 is assigned to the Nth user device 616. One approach to this involves assigning time segments 618 and 619 according to the complexity of each time segment and the strength of each user device 614 and 616.

In some embodiments, a server has calculated a complexity analysis score for each time segment of the plurality of time segments and a strength capability score for each user device of the plurality of user devices (e.g., as described above with reference to FIG. 1).

In some embodiments, time segments are assigned to user devices with appropriate strength capability scores relative to the time segment's complexity analysis score. For example, time segment 618 is assigned to first user device 614 because time segment 618 has a lower complexity analysis score than time segment 619, and user device 614 has a lower strength capability score than Nth user device 616.

Figure 7A:
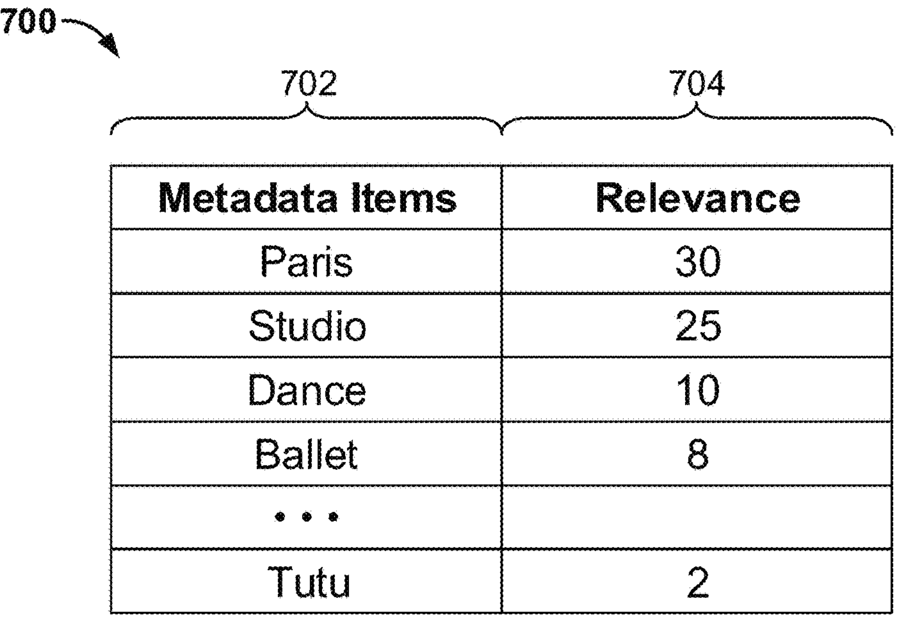
FIG. 7A shows a table illustrating relevance values and verified user counts tied to metadata items, in accordance with some embodiments of the present disclosure.

FIG. 7A shows table 700 illustrating relevance values and verified user counts tied to metadata items, in accordance with some embodiments of the present disclosure. Table 700 includes metadata items 702 and relevance values 704. In some embodiments, metadata items 702 are the same as metadata items 140 within FIG. 1.

In some embodiments, system 700 outlines further details of action 136 within FIG. 1 in which metadata 140 is generated by server 114 from the frame analysis data and user input data transmitted to server 114.

In some embodiments, metadata may be available for a media asset, but the relevance values of some of the metadata items are inaccurate. For example, a media asset has metadata items 702 (e.g., "Paris," "Studio," "Dance," "Ballet," and "Tutu") but some of the metadata items 702 (e.g., "Paris" and "Studio") have higher relevance values 704 than other metadata items 702 (e.g., "Dance," "Ballet," and "Tutu"). When new metadata items generated by user devices match the existing metadata items 702, the relevance values 704 of the existing metadata items 702 are increased. For example, when the media asset with the metadata items "Paris", "Studio", "Dance", "Ballet" and "Tutu" is analyzed by user devices, metadata items for "Dance" and "Ballet" are generated. This increases the relevance value of "Dance" and "Ballet" by one.

Figure 7B:
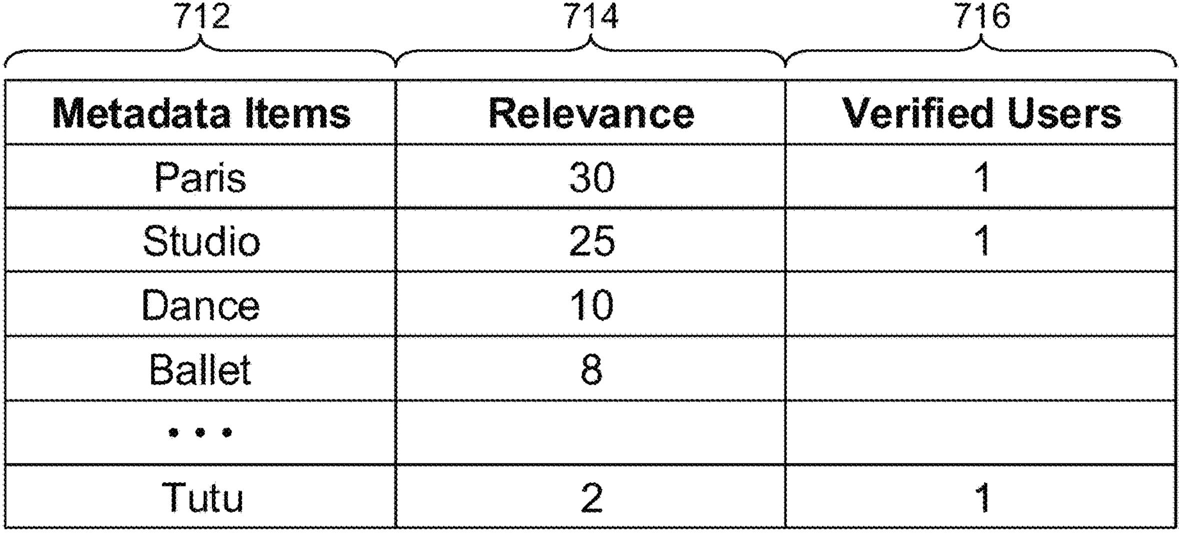
FIG. 7B shows a table illustrating relevance values and verified user counts tied to metadata items, in accordance with some embodiments of the present disclosure.

FIG. 7B shows table 710 illustrating relevance values and verified user counts tied to metadata items, in accordance with some embodiments of the present disclosure. Table 710 includes metadata item data points 712, relevance values 714, and verified users 716. In some embodiments, metadata item data points 712 are the same as metadata items 140 within FIG. 1. In one example, verified users are user devices linked to accounts registered within the OTT video delivery service server 114 mentioned within FIG. 1, and unverified users are user devices without accounts. In one example, the number of verified users is the total number of verified user devices that have analyzed media assets, gathered data, and sent the data to the server.

In some embodiments, system 710 outlines further details of action 136 within FIG. 1, in which metadata 140 is generated by server 114 from the frame analysis data and user input data transmitted to server 114.

In some embodiments, when a server generates metadata from analysis by a verified user device, the number of verified users 716 associated with one of the metadata items 712 is incremented. For example, metadata items 712 (e.g., "Paris," "Studio," and "Tutu") are generated based on analysis by verified user devices. In some embodiments, this increases the number of verified users 716 for the metadata items 712 (e.g., "Paris", "Studio", and "Tutu") by one. In some embodiments, the number of verified users 716 for the metadata items 712 does not affect the relevance values 714 of the metadata items 712. In some embodiments, the number of verified users 716 for the metadata items 712 increases the relevance values 714 of the metadata items 712. In some examples, garnering sufficiently high relevance values results in metadata for a media asset being marked as sufficient by a server. For example, at process step 106 within FIG. 1, wherein the MGA makes decision 122, determining whether server 114 has insufficient metadata associated with media asset 116, the MGA may decide that there is sufficient metadata associated with the media asset if the relevance values of the metadata present are above a preset threshold value, e.g., if the relevance threshold value is 5, and there are 3 metadata items with relevance level 5, server 114 may determine that there is sufficient metadata for media asset 116 and stop the process.

Figure 8:
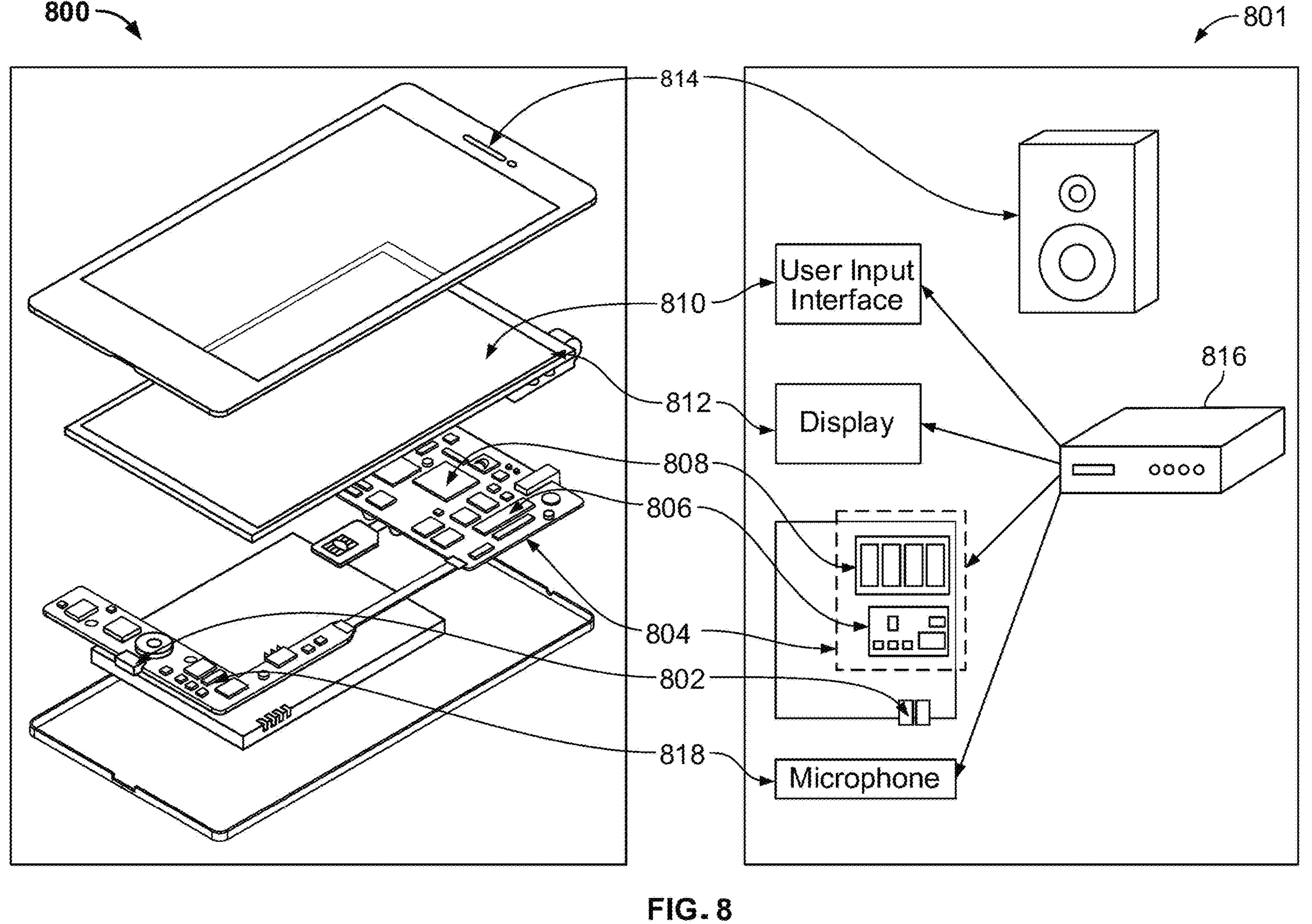
FIG. 8 shows a block diagram of an illustrative media device, in accordance with some embodiments of this disclosure.
Figure 9:
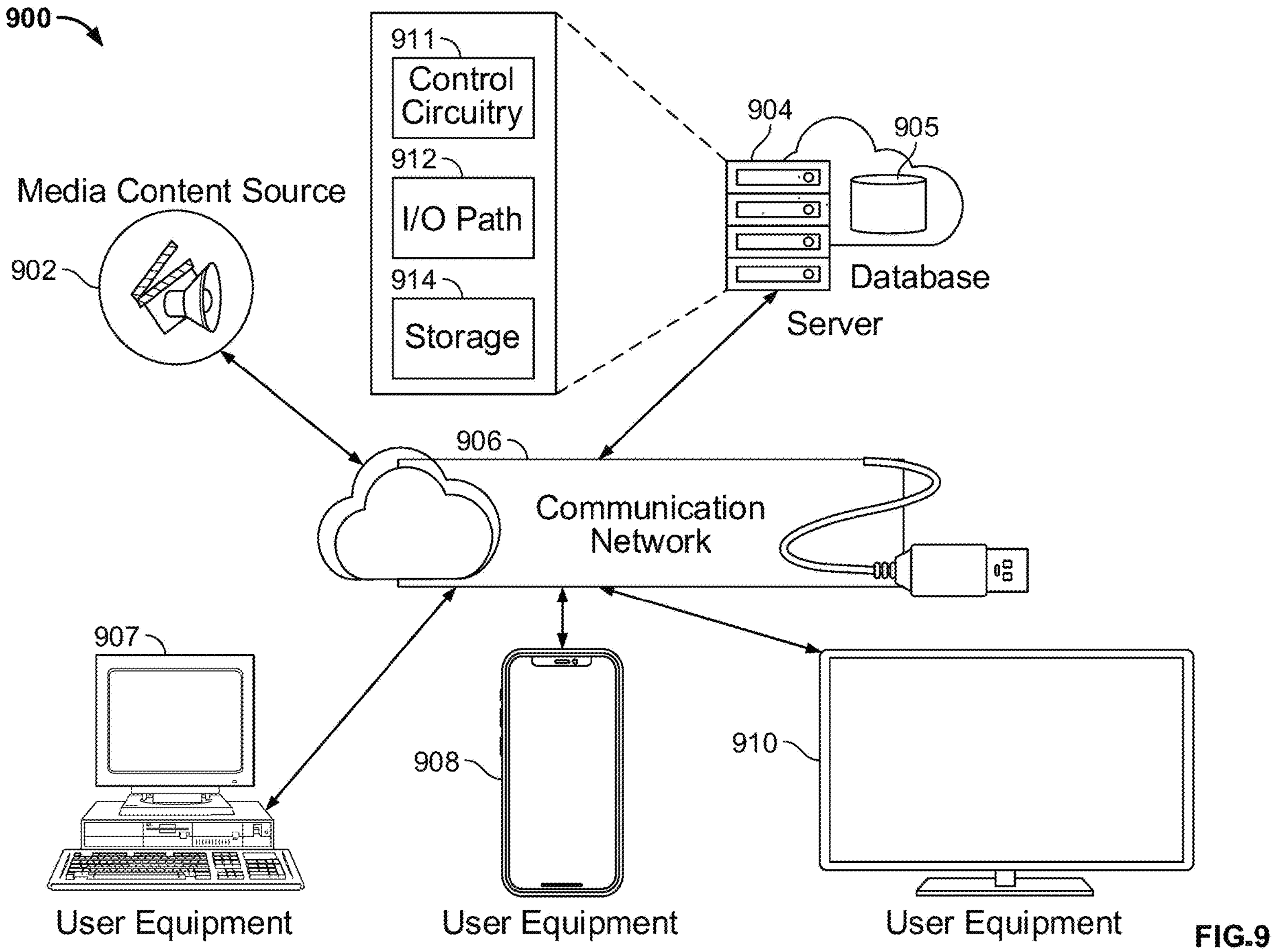
FIG. 9 shows a block diagram of an illustrative media system, in accordance with some embodiments of this disclosure.

FIGS. 8-9 describe exemplary devices, systems, servers, and related hardware for generating metadata for a media asset (e.g., user-generated content), in accordance with some embodiments of the present disclosure. FIG. 8 shows generalized embodiments of illustrative devices 800 and 801. For example, devices 800 and 801 may be smartphone devices, laptops, or televisions (e.g., any one of N user devices 118 of FIG. 1). Device 801 may include set-top box 816. Set-top box 816 may be communicatively connected to microphone 818, speaker 814, and display 812. In some embodiments, microphone 818 may receive voice commands. In some embodiments, display 812 may be a television display or a computer display. In some embodiments, set-top box 816 may be communicatively connected to user input interface 810. In some embodiments, user input interface 810 may be a remote control device. Set-top box 816 may include one or more circuit boards. In some embodiments, the circuit boards may include processing circuitry, control circuitry, and storage (e.g., RAM, ROM, Hard Disk, Removable Disk, etc.). In some embodiments, the circuit boards may include an input/output path. More specific implementations of devices are discussed below in connection with FIG. 8. Each one of devices 800 and 801 may receive content and data via input/output ("I/O") path 802. I/O path 802 may provide content (e.g., broadcast programming, on-demand programming, internet content, content available over a local area network (LAN) or wide area network (WAN), and/or other content) and data to control circuitry 804, which includes processing circuitry 806 and storage 608. Control circuitry 804 may be used to send and receive commands, requests, and other suitable data using I/O path 802, which may comprise I/O circuitry. I/O path 802 may connect control circuitry 804 (and specifically processing circuitry 606) to one or more communications paths (described below). I/O functions may be provided by one or more of these communications paths, but are shown as a single path in FIG. 8 to avoid overcomplicating the drawing.

Control circuitry 804 may be based on any suitable processing circuitry such as processing circuitry 806. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 804 executes instructions for a media application stored in memory (i.e., storage 808). Specifically, control circuitry 804 may be instructed by the media application to perform the functions discussed above and below. In some implementations, any action performed by control circuitry 804 may be based on instructions received from the media application.

In client/server-based embodiments, control circuitry 804 may include communications circuitry suitable for communicating with a media application server or other networks or servers. The instructions for carrying out the above mentioned functionality may be stored on a server (which is described in more detail in connection with FIG. 8). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the internet or any other suitable communication networks or paths (which is described in more detail in connection with FIG. 8). In addition, communications circuitry may include circuitry that enables peer-to-peer communication of devices, or communication of devices in locations remote from each other (described in more detail below).

Memory may be an electronic storage device provided as storage 808 that is part of control circuitry 804. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 808 may be used to store various types of content described herein as well as media application data described above. Nonvolatile memory may also be used (e.g., to launch a boot-up routine and other instructions). Cloud-based storage, described in relation to FIG. 8, may be used to supplement storage 808 or instead of storage 808.

Control circuitry 804 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 804 may also include scaler circuitry for upconverting and downconverting content into the preferred output format of device 800. Circuitry 804 may also include digital-to-analog converter circuitry and analog-to-digital converter circuitry for converting between digital and analog signals. The tuning and encoding circuitry may be used by device 800, 801 to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 808 is provided as a separate device from device 800, the tuning and encoding circuitry (including multiple tuners) may be associated with storage 808.

A user may send instructions to control circuitry 804 using user input interface 810. User input interface 810 may be any suitable user interface, such as a remote control, mouse, trackball, keypad, keyboard, touch screen, touchpad, stylus input, joystick, voice recognition interface, or other user input interfaces. Display 812 may be provided as a stand-alone device or integrated with other elements of each one of device 800 and device 601. For example, display 812 may be a touchscreen or touch-sensitive display. In such circumstances, user input interface 810 may be integrated with or combined with display 812. Display 812 may be one or more of a monitor, a television, a display for a mobile device, or any other type of display. A video card or graphics card may generate the output to display 812. The video card may be any processing circuitry described above in relation to control circuitry 804. The video card may be integrated with the control circuitry 804. Speakers 814 may be provided as integrated with other elements of each one of device 800 and device 801 or may be stand-alone units. The audio component of videos and other content displayed on display 812 may be played through the speakers 814. In some embodiments, the audio may be distributed to a receiver (not shown), which processes and outputs the audio via speakers 814.

The media application may be implemented using any suitable architecture. For example, it may be a stand-alone application wholly-implemented on each one of device 800 and device 801. In such an approach, instructions of the application are stored locally (e.g., in storage 808), and data for use by the application is downloaded on a periodic basis (e.g., from an out-of-band feed, from an internet resource, or using another suitable approach). Control circuitry 804 may retrieve instructions of the application from storage 808 and process the instructions to rearrange the segments as discussed. Based on the processed instructions, control circuitry 804 may determine what action to perform when input is received from user input interface 810. For example, movement of a cursor on a display up/down may be indicated by the processed instructions when user input interface 810 indicates that an up/down button was selected.

In some embodiments, the media application is a client/server-based application. Data for use by a thick or thin client implemented on each one of device 800 and user equipment system 801 is retrieved on-demand by issuing requests to a server remote to each one of device 800 and device 801. In one example of a client/server-based guidance application, control circuitry 804 runs a web browser that interprets web pages provided by a remote server. For example, the remote server may store the instructions for the application in a storage device. The remote server may process the stored instructions using circuitry (e.g., control circuitry 804) to perform the operations discussed in connection with FIGS. 1-7 and 10-11.

In some embodiments, the media application may be downloaded and interpreted or otherwise run by an interpreter or virtual machine (run by control circuitry 804). In some embodiments, the media application may be encoded in the ETV Binary Interchange Format (EBIF), received by the control circuitry 804 as part of a suitable feed, and interpreted by a user agent running on control circuitry 804. For example, the media application may be an EBIF application. In some embodiments, the media application may be defined by a series of JAVA-based files that are received and run by a local virtual machine or other suitable middleware executed by control circuitry 804. In some of such embodiments (e.g., those employing MPEG-2 or other digital media encoding schemes), the media application may be, for example, encoded and transmitted in an MPEG-2 object carousel with the MPEG audio and video packets of a program.

FIG. 9 is a diagram of an illustrative streaming system, in accordance with some embodiments of the disclosure. Devices 907, 908, 910 (e.g., any one of N user devices 118 of FIG. 1) may be coupled to communication network 906. Communication network 906 may be one or more networks including the internet, a mobile phone network, mobile voice or data network (e.g., a 4G or LTE network), cable network, public switched telephone network, or other types of communication network or combinations of communication networks. In some embodiments, communication network 906 is the network of FIG. 1 that Over the Top (OTT) video delivery service server 114 receives requests over. Paths (e.g., depicted as arrows connecting the respective devices to the communication network 906) may separately or together include one or more communications paths, such as a satellite path, a fiber-optic path, a cable path, a path that supports internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 9 to avoid overcomplicating the drawing.

Although communications paths are not drawn between devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The devices may also communicate with each other directly through an indirect path via communication network 906.

System 900 includes a media content source 902 and a server 904, which may comprise or be associated with database 905. Communications with media content source 902 and server 904 may be exchanged over one or more communications paths but are shown as a single path in FIG. 9 to avoid overcomplicating the drawing. In addition, there may be more than one of each of media content source 902 and server 904, but only one of each is shown in FIG. 9 to avoid overcomplicating the drawing. If desired, media content source 902 and server 904 may be integrated as one source device.

In some examples, the processes outlined within system 900 are performed by the MGA of FIG. 1. In some embodiments, server 904 may include control circuitry 911 and a storage 914 (e.g., RAM, ROM, Hard Disk, Removable Disk, etc.). In some embodiments, storage 914 may store instructions that when, executed by control circuitry 911, may cause execution of the MGA, for example, by causing the MGA to execute the steps outlined within system 900. Server 904 may also include an input/output path 912. I/O path 912 may provide device information, or other data, over a local area network (LAN) or wide area network (WAN), and/or other content and data to the control circuitry 911, which includes processing circuitry, and storage 914. The control circuitry 911 may be used to send and receive commands, requests, and other suitable data using I/O path 912, which may comprise I/O circuitry. I/O path 912 may connect control circuitry 904 (and specifically processing circuitry) to one or more communications paths.

Control circuitry 911 may be based on any suitable processing circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, control circuitry 911 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, the control circuitry 911 executes instructions for an emulation system application stored in memory (e.g., the storage 914). Memory may be an electronic storage device provided as storage 914 that is part of control circuitry 911.

Server 904 may retrieve guidance data from media content source 902, process the data as will be described in detail below, and forward the data to devices 907 and 910. Media content source 902 may include one or more types of content distribution equipment including a television distribution facility, cable system headend, satellite distribution facility, programming sources (e.g., television broadcasters, such as NBC, ABC, HBO, etc.), intermediate distribution facilities and/or servers, internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Media content source 902 may be the originator of content (e.g., a television broadcaster, a Webcast provider, etc.) or may not be the originator of content (e.g., an on-demand content provider, an internet provider of content of broadcast programs for downloading, etc.). Media content source 902 may include cable sources, satellite providers, on-demand providers, internet providers, over-the-top content providers, or other providers of content. Media content source 902 may also include a remote media server used to store different types of content (including video content selected by a user), in a location remote from any of the client devices. Media content source 902 may also provide metadata that can be used to identify important segments of media content as described above.

Client devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices (such as, e.g., server 904), which may be located centrally or at distributed locations, that provide cloud-based services to various types of users and devices connected via a network such as the internet via communication network 906. In such embodiments, devices may operate in a peer-to-peer manner without communicating with a central server.

Figure 10:
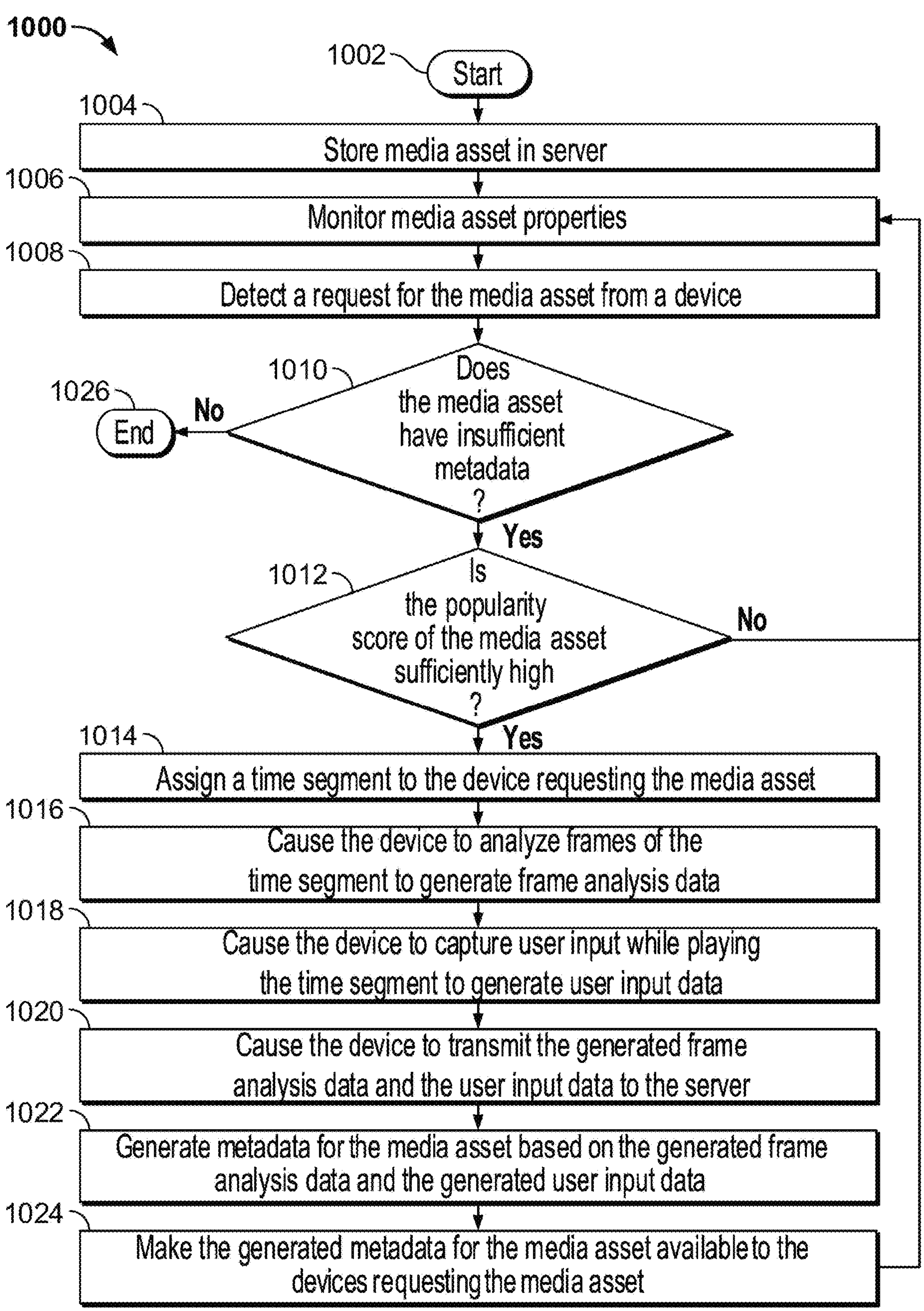
FIG. 10 shows a flowchart of an illustrative process for generating metadata for content, in accordance with some embodiments of the present disclosure.

FIG. 10 shows a flowchart of an illustrative process 1000 for generating metadata for content, in accordance with some embodiments of the present disclosure. In various embodiments, the individual steps of process 1000 may be implemented by the MGA of FIG. 1. For example, non-transitory memories of one or more components of the server and devices of FIGS. 8-9, e.g., storage 914 and control circuitry 911, may store instructions that, when executed by the server and devices of FIGS. 8 and 9, cause execution of the process described by FIG. 10, e.g., as part of execution of the MGA.

At 1002, process 1000 begins. At 1004, storage, for example, storage 914, stores a media asset (e.g., media asset 116) in a server (e.g., server 114). At 1006, control circuitry, for example, control circuitry 911, monitors the properties of the media asset. At 1008, the input/output circuitry, for example, I/O path 912, receives a request for the media asset from a device (e.g., any one of N devices 118). The received request may be transmitted via any suitable input (e.g., voice input, touch input, text entry, navigating a user interface, etc.).

Upon receiving the request, at 1010, the control circuitry determines whether the media asset has insufficient metadata. If the media asset does not have insufficient metadata, the MGA proceeds to 1026, and process 1000 ends. If the media asset does have insufficient metadata, the MGA proceeds to 1012. At 1012, the control circuitry determines whether the popularity score of the media asset is sufficiently high. If the popularity score of the media asset is not sufficiently high, the control circuitry returns to 1006, and continues to monitor the properties of the media asset. If the popularity score of the media asset is sufficiently high, the control circuitry proceeds to 1014.

At 1014, the control circuitry assigns a time segment to the device requesting the media asset. At 1016, the control circuitry causes the device to analyze frames of the time segment to generate frame analysis data. The control circuitry may, for example, cause the device to analyze frames of the time segment by transmitting embedded HTML instructions within the website that is being accessed on the user device to play the video. In another example, the control circuitry may transmit instructions embedded in a video app that the device is accessing to play the video. Once received (e.g., as part of playing the video) the control circuitry of the user device will execute the code, and the user device will analyze frames of the time segment to generate frame analysis data. In some embodiments, At 1018, the control circuitry causes the device to capture user input while playing the time segment to generate user input data. The control circuitry may, for example, cause the device to capture user input while playing the time segment by transmitting embedded HTML instructions within the website that is being accessed on the user device to play the video. In another example, the control circuitry may transmit instructions embedded in a video app that the device is accessing to play the video. Once received (e.g., as part of playing the video) the control circuitry of the user device will execute the code, and the user device will capture user input while playing the time segment to generate user input data.

At 1020, the control circuitry causes the device to transmit the generated frame analysis data and the user input data to the server. The control circuitry may, for example, cause the device to transmit the generated frame analysis data and the user input data to the server by transmitting embedded HTML instructions within the website that is being accessed on the user device to play the video. In another example, the control circuitry may transmit instructions embedded in a video app that the device is accessing to play the video. Once received (e.g., as part of playing the video) the control circuitry of the user device will execute the code, and the user device will transmit the generated frame analysis data and the user input data to the server. At 1022, the control circuitry generates metadata for the media asset based on the generated frame analysis and user input data. At 1024, the control circuitry makes the generated metadata for the media asset available to the devices requesting the media asset. Then, the control circuitry returns to 1006, and continues to monitor the properties of the media asset until another request is detected.

Figure 11:
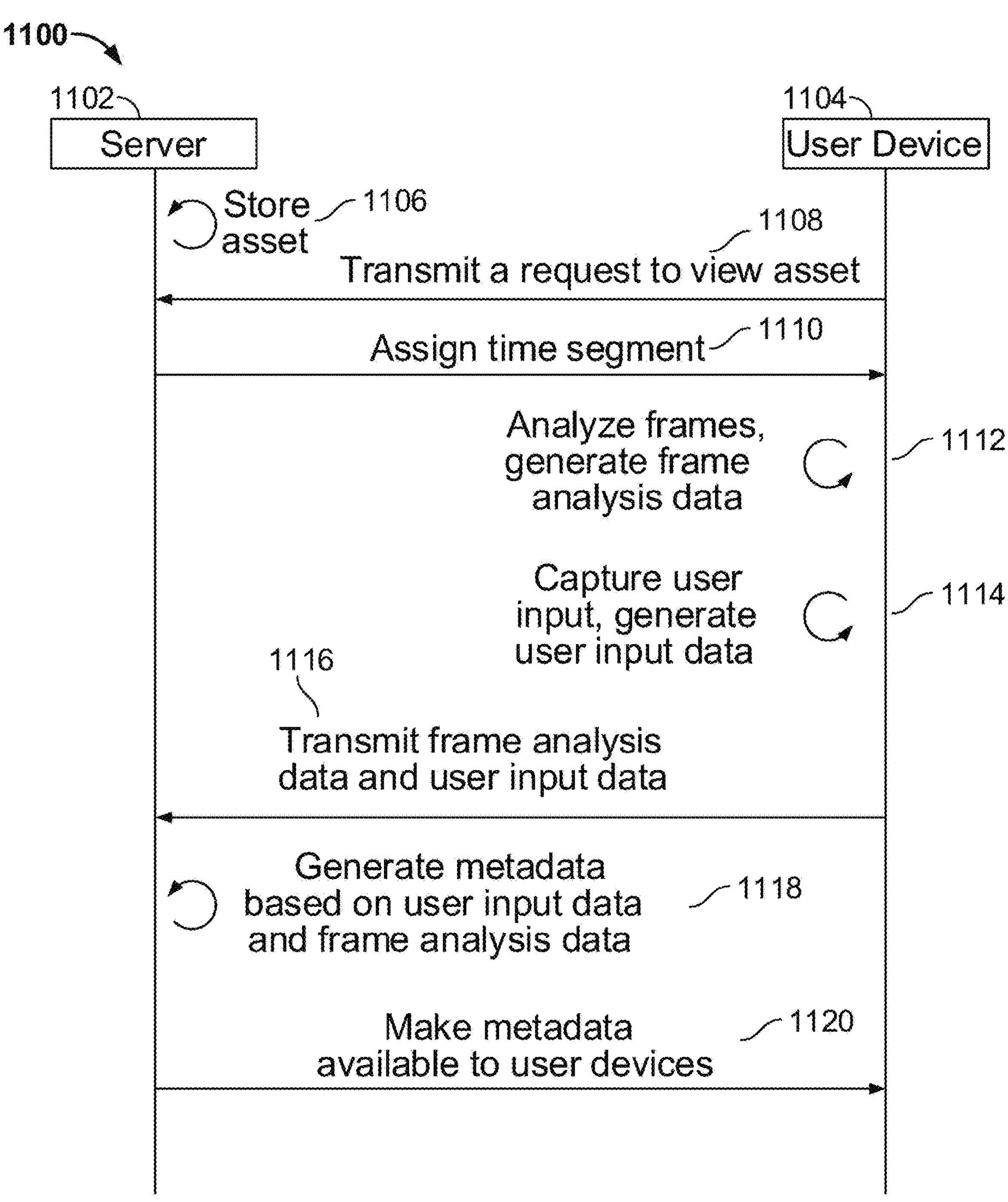
FIG. 11 shows a flow diagram of an illustrative process for generating metadata for content, in accordance with some embodiments of the present disclosure.

FIG. 11 shows a flow diagram of an illustrative process 1100 for generating metadata for content, in accordance with some embodiments of the present disclosure. In various embodiments, the individual steps of process 1100 may be implemented by the MGA of FIG. 1. For example, non-transitory memories of one or more components of the server and devices of FIGS. 8-9, e.g., storage 914 and control circuitry 911, may store instructions that, when executed by the server and devices of FIGS. 8 and 9, cause execution of the process described by FIG. 11, e.g., as part of execution of the MGA.

At 1106, it is demonstrated that storage circuitry, for example, storage circuitry 914, stores a media asset (e.g., media asset 116) in a server (e.g., server 114) 1102. At 1108, server 1102 receives via input/output circuitry, for example, I/O path 912, a request from user device 1104 to view the media asset. At 1110, control circuitry causes server 1102 to assign a time segment (e.g., time segment 126) to user device 1104. At 1112, control circuitry causes user device 1104 to analyze frames of the time segment and generate frame analysis data. At 1114, the control circuitry causes user device 1104 to capture user input and generate user input data. At 1116, user device 1104 transmits the frame analysis and user input data to server 1102. At 1118, server 1102 generates metadata based on the frame analysis and user input data. At 1120, server 1102 makes metadata available to user device 1104.

The foregoing is merely illustrative of the principles of this disclosure and its various embodiments. Various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations and modifications thereof, which are within the spirit of the following claims.

Unless otherwise defined herein, scientific and technical terms used in this application shall have the meanings that are commonly understood by those of ordinary skill in the art. In case of conflict, the present specification, will control.

The practice of the present disclosure will employ, unless otherwise indicated, suitable techniques for generating metadata for user-generated content.

Throughout this specification and embodiments, the word "comprise," or variations such as "comprises" or "comprising," will be understood to allow the inclusion of a stated integer or group of integers, but not the exclusion of any other integer or group of integers. "Comprising" may be synonymous with "including" or "containing."

The term “including” is used to mean “including, but not limited to.” “Including” and “including but not limited to” are used interchangeably.

Any example(s) following the term “e.g.” or “for example” is not meant to be exhaustive or limiting.

Unless otherwise required by context, singular terms shall include pluralities and plural terms shall include the singular.

The articles “a”, “an” and “the” are used herein to refer to one or to more than one (i.e., to at least one) of the grammatical object of the article. By way of example, “an element” means one element or more than one element. As used herein, the term “about” modifying the quantity of an ingredient, parameter, calculation, or measurement in the compositions of the disclosure or employed in the methods of the disclosure refers to variation in the numerical quantity that can occur, for example, through typical measuring and/or liquid handling procedures used for making isolated polypeptides or pharmaceutical compositions in the real world; through inadvertent error in these procedures; through differences in the manufacture, source, or purity of the ingredients employed to make the compositions or carry out the methods; and the like without having a substantial effect on the chemical or physical attributes of the compositions or methods of the disclosure. Such variations can be within an order of magnitude, typically within 10%, more typically still within 5%, of a given value or range. The term “about” also encompasses amounts that differ due to different equilibrium conditions for a composition resulting from a particular initial mixture. Whether or not modified by the term “about”, the paragraphs include equivalents to the quantities. Reference to “about” a value or parameter herein also includes (and describes) embodiments that are directed to that value or parameter per se. For example, description referring to “about X” includes the description of “X.” Numeric ranges are inclusive of the numbers defining the range.

What is claimed is:

1. A method comprising:

storing, by a server, a media asset, wherein the media asset is available to be requested by a plurality of devices;

receiving, by a server, a first request for a content item from a first user device;

receiving, by the server, a second request for the content item from a second user device;

assigning, by the server, a first portion of a plurality of portions of the content item to the first user device, and assigning, by the server, a second portion of the plurality of portions of the content item to the second user device;

causing the first user device to generate first metadata based on the first portion of the content item assigned to the first user device;

causing the second user device to generate second metadata based on the second portion of the content item assigned to the second user device;

generating, by the server, combined metadata for the content item based on the first metadata generated by the first user device and the second metadata generated by the second user device; and storing, by the server, the combined metadata as associated with the content item.

2. The method of claim 1, wherein the assigning, by the server, the first portion of the plurality of portions of the content item to the first user device and the second portion of the plurality of portions of the content item to the second user device comprises:

calculating a first complexity analysis score for the first portion and a second complexity analysis score for the second portion;

calculating a first strength capability score for the first user device and a second strength capability score for the second user device;

assigning the first portion to the first user device and the second portion to the second user device, based on: (a) the second complexity analysis score being higher than the first complexity analysis score, and (b) the second strength capability score being higher than the first strength capability score.

3. The method of claim 2, wherein the first strength capability score and the second strength capability score are calculated based on one or more of: processor speed, number of installed applications, amount of RAM present, device heat, stored user preferences for processing content, or processing history of the first user device and the second user device, respectively.

4. The method of claim 2, wherein the first complexity analysis score is calculated based on a length of the first portion and the second complexity analysis score is calculated based on a length of the second portion.

5. The method of claim 1, wherein the causing the first user device to generate the first metadata based on the first portion of the content item assigned to the first user device and the second user device to generate the second metadata based on the second portion of the content item assigned to the second user device comprises:

causing the first user device and the second user device to gather keywords from one or more social media posts, text messages, or electronic mail messages generated on the first user device while the first user device is generating for display the first portion of the content item and on the second user device while the second user device is generating for display the second portion of the content item.

6. The method of claim 5, wherein the keywords from the one or more social media posts, text messages, or electronic mail messages comprise keywords tagged to a second content item shared in the one or more social media posts, text messages, or electronic mail messages.

7. The method of claim 5, wherein the keywords received as spoken expressions on the first user device are received by a smart speaker associated with the first user device and wherein the keywords received as spoken expressions on the second user device are received by a smart speaker associated with the second user device.

8. The method of claim 1, wherein the causing the first user device to generate the first metadata based on the first portion of the content item assigned to the first user device and the second user device to generate the second metadata based on the second portion of the content item assigned to the second user device comprises:

causing the first user device and the second user device to gather keywords received as spoken expressions on the first user device while the first user device is generating for display the first portion of the content item and on the second user device while the second user device is generating for display the second portion of the content item.

9. The method of claim 1, wherein the content item is a first content item, further comprising:

determining, by the server, that the first content item is lacking sufficient metadata, wherein the determining, by the server, that the first content item is lacking sufficient metadata comprises:

storing, by the server, a plurality of content items, wherein the plurality of content items is available to be requested by a plurality of devices;

identifying, by the server, a second content item of the plurality of content items, wherein the second content item has received a similar number of requests as the first content item;

determining, by the server, a current number of metadata items associated with the second content item;

setting, by the server, a threshold value based on the current number of metadata items associated with the second content item;

determining a current number of metadata items associated with the first content item stored by the server; and determining that the current number of metadata items associated with the first content item is below the threshold value set by the server.

10. The method of claim 1, further comprising:

receiving, by the server, a third request for the content item from a third user device; and making available, by the server, to the third user device, the stored combined metadata associated with the content item.

11. A system comprising:

control circuitry configured to:

receive, by a server, a first request for a content item from a first user device;

receive, by the server, a second request for the content item from a second user device;

assign, by the server, a first portion of a plurality of portions of the content item to the first user device, and assign, by the server, a second portion of the plurality of portions of the content item to the second user device;

cause the first user device to generate first metadata based on the first portion of the content item assigned to the first user device;

cause the second user device to generate second metadata based on the second portion of the content item assigned to the second user device;

generate, by the server, combined metadata for the content item based on the first metadata generated by the first user device and the second metadata generated by the second user device; and storage circuitry configured to:

store, by the server, the combined metadata as associated with the content item.

12. The system of claim 11, wherein the control circuitry is configured to assign, by the server, the first portion of the plurality of portions of the content item to the first user device and the second portion of the plurality of portions of the content item to the second user device by:

calculating a first complexity analysis score for the first portion and a second complexity analysis score for the second portion;

calculating a first strength capability score for the first user device and a second strength capability score for the second user device;

assigning the first portion to the first user device and the second portion to the second user device, based on: (a) the second complexity analysis score being higher than the first complexity analysis score, and (b) the second strength capability score being higher than the first strength capability score.

13. The system of claim 12, wherein the control circuitry is further configured to calculate the first strength capability score and the second strength capability score based on one or more of: processor speed, number of installed applications, amount of RAM present, device heat, stored user preferences for processing content, or processing history of the first user device and the second user device, respectively.

14. The system of claim 12, wherein the control circuitry is further configured to calculate the first complexity analysis score based on a length of the first portion and the second complexity analysis score based on a length of the second portion.

15. The system of claim 11, wherein the control circuitry is further configured to cause the first user device to generate the first metadata based on the first portion of the content item assigned to the first user device and the second user device to generate the second metadata based on the second portion of the content item assigned to the second user device by:

causing the first user device and the second user device to gather keywords from one or more social media posts, text messages, or electronic mail messages generated on the first user device while the first user device is generating for display the first portion of the content item and on the second user device while the second user device is generating for display the second portion of the content item.

16. The system of claim 15, wherein the keywords from the one or more social media posts, text messages, or electronic mail messages comprise keywords tagged to a second content item shared in the one or more social media posts, text messages, or electronic mail messages.

17. The system of claim 15, wherein the control circuitry is further configured to receive the keywords received as spoken expressions on the first user device by a smart speaker associated with the first user device and the keywords received as spoken expressions on the second user device by a smart speaker associated with the second user device.

18. The system of claim 11, wherein the control circuitry is further configured to cause the first user device to generate the first metadata based on the first portion of the content item assigned to the first user device and the second user device to generate the second metadata based on the second portion of the content item assigned to the second user device by:

causing the first user device and the second user device to gather keywords received as spoken expressions on the first user device while the first user device is generating for display the first portion of the content item and on the second user device while the second user device is generating for display the second portion of the content item.

19. The system of claim 11, wherein the content item is a first content item, and wherein the control circuitry is further configured to:

determine, by the server, that the content item is lacking sufficient metadata, wherein the control circuitry is configured to determine, by the server, that the content item is lacking sufficient metadata by:

storing, by the server, a plurality of content items, wherein the plurality of content items is available to be requested by a plurality of devices;

identifying, by the server, a second content item of the plurality of content items, wherein the second content item has received a similar number of requests as the first content item;

determining, by the server, a current number of metadata items associated with the second content item;

setting, by the server, a threshold value based on the current number of metadata items associated with the second content item;

determining a current number of metadata items associated with the first content item stored by the server; and determining that the current number of metadata items associated with the first content item is below the threshold value set by the server.

20. The system of claim 11, wherein the input/output circuitry is further configured to:

receive, by the server, a third request for the content item from a third user device; and wherein the control circuitry is further configured to:

make available, by the server, to the third user device, the stored combined metadata associated with the content item.

* * * * *